(12) United States Patent
Kiuchi et al.

(10) Patent No.: US 9,152,898 B2
(45) Date of Patent: Oct. 6, 2015

(54) IMAGE FORMING APPARATUS, INFORMATION PROCESSING METHOD IN IMAGE FORMING APPARATUS, AND STORAGE MEDIUM STORING PROGRAM

(71) Applicant: CANON KABUSHIKI KAISHA, Tokyo (JP)

(72) Inventors: Yohei Kiuchi, Kawasaki (JP); Toshihiko Iida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/299,484

(22) Filed: Jun. 9, 2014

(65) Prior Publication Data

US 2014/0285846 A1    Sep. 25, 2014

Related U.S. Application Data

(63) Continuation of application No. 13/415,441, filed on Mar. 8, 2012, now Pat. No. 8,780,411.

(30) Foreign Application Priority Data

Mar. 14, 2011 (JP) ................................ 2011-055224
Apr. 5, 2011 (JP) ................................ 2011-084077
Feb. 8, 2012 (JP) ................................ 2012-025535

(51) Int. Cl.
*H04N 1/40* (2006.01)
*G06K 15/00* (2006.01)
*G03G 15/00* (2006.01)

(52) U.S. Cl.
CPC ............ *G06K 15/4065* (2013.01); *G03G 15/50* (2013.01); *G03G 15/502* (2013.01); *G03G 15/5087* (2013.01)

(58) Field of Classification Search
CPC ... G06F 3/1285; G06F 3/1205; G06F 3/1288; G06F 3/1204; G06F 3/1208; G06F 3/1284; G06F 3/1253; G06F 3/1229; G06F 3/1255; G03G 2215/00109; G03G 15/5029; G03G 15/553; H04N 2201/0094; H04N 1/00482; H04N 1/00413; H04N 1/00416; G06K 15/4065; G06K 15/1823; B41J 11/009; B41J 11/485; B41J 13/103
USPC ............ 358/1.9, 2.1, 449, 486, 496, 498, 468
See application file for complete search history.

(56) References Cited

U.S. PATENT DOCUMENTS 5,559,933 A * 9/1996 Boswell ........................ 358/1.15
5,638,497 A * 6/1997 Kimber et al. ............... 358/1.15

(Continued)

FOREIGN PATENT DOCUMENTS

CN    101047759 A    10/2007
JP    11-217131 A    8/1999

(Continued)

OTHER PUBLICATIONS

Office Action issued in corresponding CN Patent Application No. 201210066851.7 dated Jul. 2, 2014.

(Continued)

*Primary Examiner* — Thomas D Lee
*Assistant Examiner* — Stephen M Brinich
(74) *Attorney, Agent, or Firm* — Carter, DeLuca, Farrell & Schmidt, LLP

(57) ABSTRACT

Attribute information representing the attributes of a printing medium is stored for each printing medium. Upon receiving a print job which designates the attributes of a printing medium, it is determined whether attribute information representing the attributes designated by the print job is stored. When it is determined that the attribute information is not stored, the attribute information representing the attributes designated by the print job is newly registered.

10 Claims, 25 Drawing Sheets

(56) References Cited

U.S. PATENT DOCUMENTS

| | | |
|---|---|---|
| 2002/0097427 A1 | 7/2002 | Kazama et al. |
| 2004/0008370 A1* | 1/2004 | Keane et al. ............... 358/1.15 |
| 2006/0238777 A1 | 10/2006 | Anno et al. |
| 2007/0109587 A1 | 5/2007 | Yamakawa |
| 2007/0146789 A1* | 6/2007 | Mima et al. ............... 358/1.16 |
| 2007/0230972 A1 | 10/2007 | Akashi |

FOREIGN PATENT DOCUMENTS

| | | | |
|---|---|---|---|
| JP | 2005085022 A | * | 3/2005 |
| JP | 2006-154913 A | | 6/2006 |
| JP | 2007-314303 A | | 12/2007 |
| JP | 2007-320247 A | | 12/2007 |
| JP | 2008-217562 A | | 9/2008 |
| JP | 2008-268502 A | | 11/2008 |
| KR | 20080033853 A | | 4/2008 |

OTHER PUBLICATIONS

Korean Office Action issued on Aug. 7, 2014 in corresponding application No. 10-2012-0025371.

European Search Report issued on Oct. 9, 2012 in corresponding application No. 12158356.1.

* cited by examiner

FIG. 6

| PAPER ID | PAPER-SPECIFIC ATTRIBUTES | | | | | JOB-SPECIFIC ATTRIBUTES | | | | | PROVISIONAL REGISTRATION |
|---|---|---|---|---|---|---|---|---|---|---|---|
| | PAPER NAME | GRAMMAGE | COLOR | SURFACE PROPERTY | SHAPE | PAPER NAME | GRAMMAGE | COLOR | SURFACE PROPERTY | SHAPE | |
| 0001 | MyMediaA | 100g/m2 | WHITE | NORMAL | NORMAL | - | - | - | - | - | FALSE |
| 0002 | MyMediaB | 150g/m2 | YELLOW | RECYCLED PAPER | TAB PAPER | MyMediaB | 150g/m2 | YELLOW | RECYCLED PAPER | TAB PAPER | FALSE |
| 0003 | MyMediaC | 100g/m2 | BLUE | ONE-SIDE COATED | NORMAL | MyMediaC | - | BLUE | ONE-SIDE COATED | NORMAL | FALSE |
| 0004 | CustomName | 70g/m2 | BLUE | RECYCLED PAPER | NORMAL | MyMediaD | 150g/m2 | YELLOW | RECYCLED PAPER | - | FALSE |
| 0005 | SystemDefinedA | 100g/m2 | WHITE | NORMAL | NORMAL | - | 70g/m2 | BLUE | ONE-SIDE COATED | NORMAL | TRUE |
| ... | ... | ... | ... | ... | ... | ... | ... | ... | ... | ... | ... |

FIG. 8

```
%!PS-Adobe-3.0

%%BeginPageSetup
<< /PageSize [842 595] >> setpagedevice
<< /MediaName (MyMediaA) >> setpagedevice
<< /MediaWeight 100 >> setpagedevice
<< /MediaColor (WHITE) >> setpagedevice
<< /MediaSurface (Normal) >> setpagedevice
<< /MediaShape (Normal) >> setpagedevice
%%EndPageSetup %.......PS for page 1........
showpage
%.......PS for page 2........
showpage
%.......PS for page 3........
showpage %%BeginPageSetup
<< /PageSize [842 595] >> setpagedevice
<< /MediaName (ANY) >> setpagedevice
<< /MediaWeight 70 >> setpagedevice
<< /MediaColor (BLUE) >> setpagedevice
<< /MediaSurface (OneSideCoat) >> setpagedevice
<< /MediaShape (Normal) >> setpagedevice
%%EndPageSetup %.......PS for page 4........
showpage
%.......PS for page 5........
showpage
%.......PS for page 6........
showpage
```

DETAILS/EDIT

- NAME
  ▷ SYSTEM REGISTERED PAPER 1   CHANGE ▲

- TYPE   ▷ USER SET PAPER   CHANGE ▲
- GRAMMAGE   ▷ 85g/m²   CHANGE ▲
- FEATURE   ▷ NONE   CHANGE ▲
- SURFACE PROPERTY   ▷ WOOD-FREE PAPER   CHANGE ▲
- ADJUST CREEP (SHIFT) CORRECTION AMOUNT   ▷ 0.00mm   CHANGE ▲
- COLOR   ▷ WHITE   CHANGE ▲
- CURL CORRECTION AMOUNT   ▷ NOT ADJUST   CHANGE ▲
- ADJUST IMAGE POSITION   ▷ NOT ADJUST   CHANGE ▲

CLOSE

7266 PRINTER   NO PAPER   SYSTEM MONITOR ▲

FIG. 19

| SHAPE (1900) | SURFACE PROPERTY (1901) | MASS (1902) | | | | | | | |
|---|---|---|---|---|---|---|---|---|---|
| | | 52~63 / 57 | 64~79 / 77 | 80~105 / 85 | 106~128 / 117 | 129~150 / 140 | 151~180 / 160 | 181~209 / 190 | 210~256 / 235 | 257~300 / 280 |
| NORMAL | WOOD-FREE PAPER | ▨ | ▨ | ▨ | ▨ | ▨ | ▨ | ▨ | ▨ | ▨ |
| | RECYCLED PAPER | | ▨ | ▨ | ▨ | ▨ | | | | |
| | COATED PAPER | | | ▨ | ▨ | ▨ | ▨ | ▨ | ▨ | ▨ |
| | EMBOSSED | | | | ▨ | ▨ | ▨ | ▨ | ▨ | |
| | VELLUM | | | | ▨ | | | | | |
| | OHP | | | | | | | | | |
| | LABEL | | | | | | | | | |
| INDEX PAPER | WOOD-FREE PAPER | | | | | ▨ | ▨ | ▨ | ▨ | |
| | RECYCLED PAPER | | | | | ▨ | ▨ | | | |
| | COATED PAPER | | | ▨ (1903) | ▨ | ▨ | ▨ | ▨ | ▨ | |
| | EMBOSSED | | | | | ▨ | ▨ | ▨ | ▨ | |
| PUNCHED PAPER | WOOD-FREE PAPER | ▨ | ▨ | ▨ | ▨ | ▨ | ▨ | ▨ | ▨ | ▨ |
| | RECYCLED PAPER | | ▨ | ▨ | ▨ | ▨ | | | | |
| | COATED PAPER | | | ▨ | ▨ | ▨ | ▨ | ▨ | ▨ | ▨ |
| | VELLUM | | | | ▨ | | | | | |
| | EMBOSSED | | | | | ▨ | ▨ | ▨ | ▨ | |
| POSTCARD | WOOD-FREE PAPER | | | | | | ▨ | ▨ | ▨ | ▨ |
| | RECYCLED PAPER | | | | | | ▨ | ▨ | ▨ | |
| | COATED PAPER | | | | | | ▨ | ▨ | ▨ | ▨ |
| | EMBOSSED | | | | | | ▨ | ▨ | ▨ | |
| ENVELOPE | WOOD-FREE PAPER | | ▨ | ▨ | ▨ | ▨ | ▨ | ▨ | ▨ | |
| | RECYCLED PAPER | | ▨ | ▨ | ▨ | ▨ | | | | |
| | VELLUM | | | | ▨ | | | | | |

FIG. 20

| SHAPE | SURFACE PROPERTY | SIZE | | | | | |
|---|---|---|---|---|---|---|---|
| | | A3 | A4 | LTR | B4 | POSTCARD | ENVELOPE | OTHER |
| INDEX PAPER | ALL | | ▨ | ▨ | | | | |
| PUNCHED PAPER | | | ▨ | ▨ | | | | |
| POSTCARD | | | | | | ▨ | | |
| ENVELOPE | | | | | | | ▨ | |
| ALL | OHP | | ▨ | ▨ | | | | |
| | LABEL | | ▨ | ▨ | ▨ | | | |

FIG. 24

```
EDIT PAPER INFORMATION

■ NAME
  ▷ 201024011231 : JobA-Booklet1  /2400      [CHANGE] ~2406
  ■ SIZE            ▷ A4 /2401               [CHANGE] ~2407
  ■ MASS            ▷ 77g/m² /2402           [CHANGE] ~2408
  ■ SHAPE           ▷ PUNCHED PAPER /2403    [CHANGE] ~2409
  ■ SURFACE PROPERTY ▷ RECYCLED PAPER /2404  [CHANGE] ~2410
  ■ SIZE            ▷ WHITE /2405            [CHANGE] ~2111

```
EDIT PAPER INFORMATION

SURFACE PROPERTY

/2500              /2501              /2502
  [WOOD-FREE PAPER]  [RECYCLED PAPER]  [COATED PAPER]

/2503              /2504              /2505
   [ EMBOSSED ]       [  VELLUM  ]       [   OHP   ]

/2506
   [  LABEL   ]

2507~ [ CANCEL ]   [  OK  ] ~2508
```

FIG. 26

SELECT REGISTRATION PAPER

| NAME | SIZE | MASS |
|---|---|---|
| 20101011231 : JobA-Booklet1 | A4 | 77g/m² |
| PP-120WP | A3 | 120g/m² |
| KJ-U12A4 | LTR | 80g/m² |
| CS-A721E | A3 | 72g/m² |
| SFB4100 | B4 | 162g/m² |
| DOC-J12C | A5 | 90g/m² |

[EDIT] [OK]

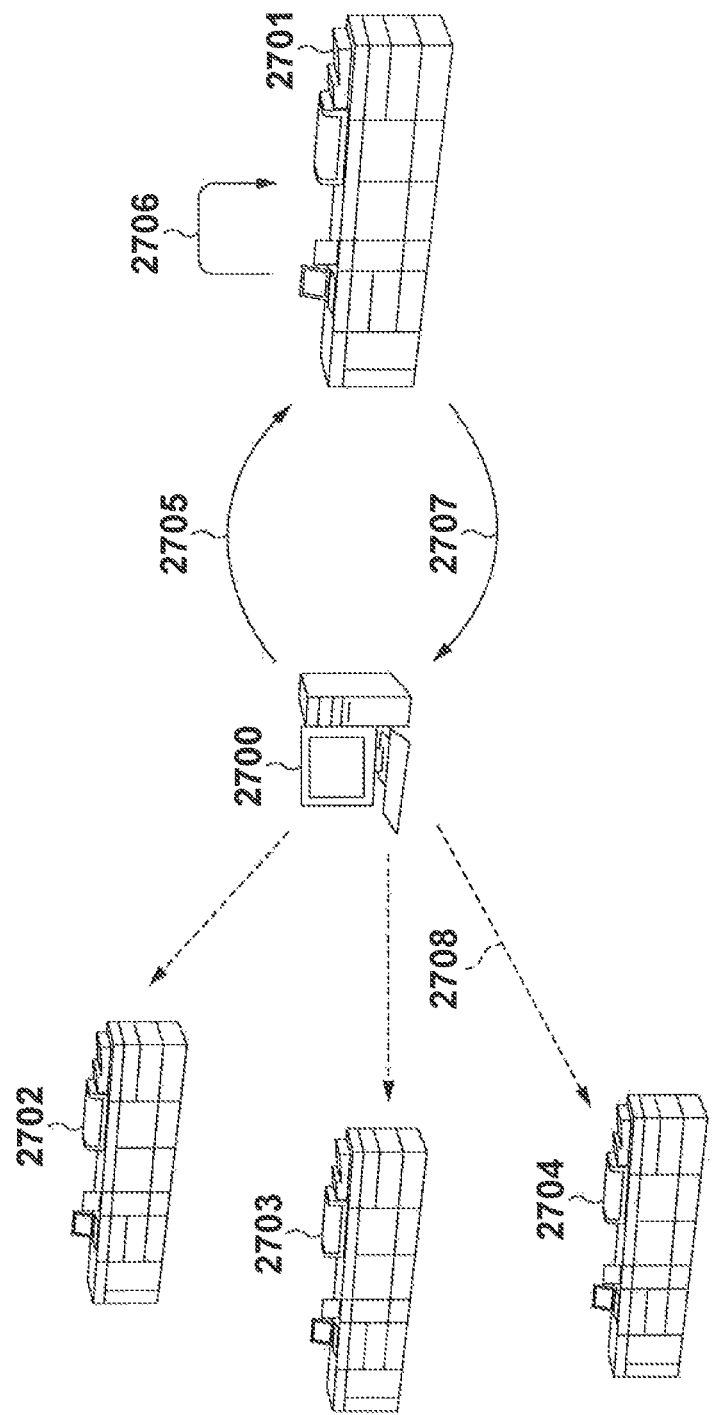

IMAGE FORMING APPARATUS, INFORMATION PROCESSING METHOD IN IMAGE FORMING APPARATUS, AND STORAGE MEDIUM STORING PROGRAM

BACKGROUND OF THE INVENTION

1. Field of the Invention

The present invention relates to an image forming apparatus which prints based on registered printing medium information, an information processing method in the image forming apparatus, and a storage medium storing a program.

2. Description of the Related Art

One conventional method registers paper of the operator's choice by designating a name, grammage, surface property, color, shape, and the like in order to control an image forming apparatus and image processing coefficients. As a method of controlling an image forming apparatus using information about paper, for example, a paper source in which paper of a designated paper size is set is automatically selected, executable processes such as two-sided printing and finishing are determined, and a toner fixing method corresponding to the paper type is determined.

Japanese Patent Laid-Open No. 11-217131 discloses a technique in which a print controller manages paper the operator wants to use, together with information including the name, size, grammage, surface property, color, and profile. According to this technique, paper selected by the operator is associated with a paper source in an image forming apparatus. When the operator designates the paper in print job designation, the paper can be fed from the associated paper source. Japanese Patent Laid-Open No. 2006-154913 discloses a technique of setting information read from a medium sensor as attribute information, and automatically registering paper information. Further, Japanese Patent Laid-Open No. 2008-268502 discloses a technique of attaching an ID code to a paper package and setting it in a paper cassette, thereby automatically registering paper information.

However, the conventional techniques cannot feed paper of the operator's choice unless he registers paper for use in a job in advance in the image forming apparatus before inputting the job. When a job which designates unregistered paper is input, it is canceled or output by rounding the paper to default paper or the like. To obtain a product the operator wants, the job needs to be input again. For higher printing efficiency, it is important to start print processing by minimum procedures. However, in an environment where various kinds of sheets are used, paper registration work before the start of a job especially takes time, decreasing the printing efficiency.

In Japanese Patent Laid-Open No. 2006-154913, the user needs to set information which cannot be acquired from the medium sensor, and register paper information. More specifically, information acquirable from the medium sensor is limited, and the user always needs to set attribute information. In addition, this method cannot be executed in a printing apparatus having no medium sensor. In Japanese Patent Laid-Open No. 2008-268502, paper information can be automatically registered by setting information in an ID code. However, the ID code needs to be attached to a paper package sold by a paper manufacturer. Also, a structure for reading paper information from the ID code is required.

SUMMARY OF THE INVENTION

An aspect of the present invention is to eliminate the above-mentioned problems with the conventional technology. The present invention provides an image forming apparatus which reduces the work load on the operator in printing medium registration processing, an information processing method in the image forming apparatus, and a storage medium storing a program.

The present invention in its first aspect provides an image forming apparatus which prints on a printing medium based on a print job, the apparatus comprising: a storage unit configured to store, for each printing medium, attribute information representing an attribute of the printing medium; an acquisition unit configured to acquire the print job that designates an attribute of the printing medium; a determination unit configured to determine whether the storage unit stores attribute information representing the attribute designated by the print job; and a registration unit configured to, when the determination unit determines that the storage unit does not store the attribute information representing the attribute designated by the print job, newly register, in the storage unit, the attribute information representing the attribute designated by the print job.

The present invention in its second aspect provides an information processing method which is executed in an image forming apparatus that includes a storage unit that stores, for each printing medium, attribute information representing an attribute of the printing medium, and prints on a printing medium based on a print job, the method comprising: an acquisition step of acquiring the print job that designates an attribute of the printing medium; a determination step of determining whether the storage unit stores attribute information representing the attribute designated by the print job; and a registration step of, when the storage unit is determined in the determination step not to store the attribute information representing the attribute designated by the print job, newly registering, in the storage unit, the attribute information representing the attribute designated by the print job.

The present invention in its third aspect provides a computer-readable storage medium storing a program for causing a computer to execute an acquisition step of acquiring a print job that designates an attribute of a printing medium, a determination step of determining whether a storage unit that stores, for each printing medium, attribute information representing an attribute of the printing medium which stores attribute information representing the attribute designated by the print job, and a registration step of, when the storage unit is determined in the determination step not to store the attribute information representing the attribute designated by the print job, newly registering, in the storage unit, the attribute information representing the attribute designated by the print job.

The present invention can reduce the work load on the operator in printing medium registration processing.

Further features of the present invention will become apparent from the following description of exemplary embodiments with reference to the attached drawings.

BRIEF DESCRIPTION OF THE DRAWINGS

FIG. 6 is a table exemplifying a paper management table;

FIG. 8 is a view exemplifying a print job;

FIG. 12 is a view exemplifying a paper selection screen;

FIG. 13 is a view exemplifying a paper edit screen;

FIG. 19 is a table for explaining a paper type counter according to the embodiment;

FIG. 20 is a table showing a prohibited combination of the size and other attributes according to the embodiment;

FIG. 24 is a view exemplifying a screen displayed on the operation unit of the image forming apparatus according to the embodiment;

FIG. 25 is a view exemplifying a screen displayed on the operation unit of the image forming apparatus according to the embodiment;

FIG. 26 is a view exemplifying a screen displayed on the operation unit of the image forming apparatus according to the embodiment; and FIG. 27 is a view for explaining transmission of registration information in the image forming apparatus according to the embodiment.

DESCRIPTION OF THE EMBODIMENTS

Figure 1:
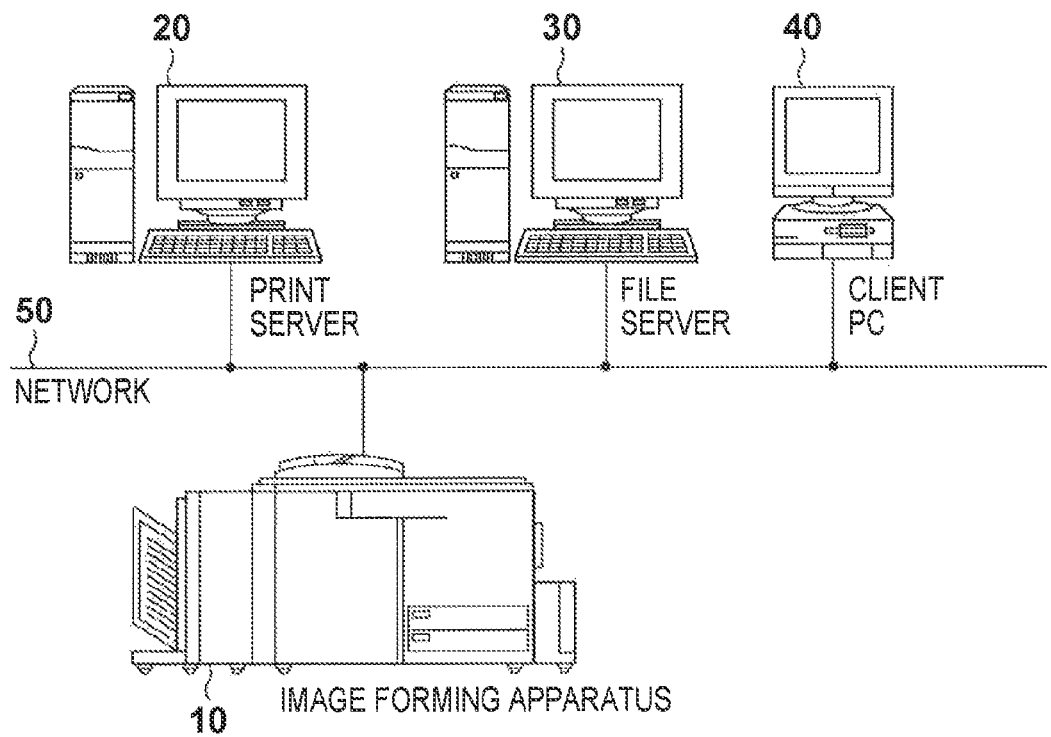
FIG. 1 is a view showing the arrangement of an image forming system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same parts, and a repetitive description thereof will be omitted.

[First Embodiment]

<Arrangement of Image Forming System>

An image forming system to which each embodiment to be described below is applicable will be described first. FIG. 1 exemplifies the arrangement of the image forming system according to an embodiment of the present invention. The image forming system according to the embodiment includes an image forming apparatus 10, print server 20, file server 30, and client PC 40. The image forming apparatus 10, print server 20, file server 30, and client PC 40 are communicably connected via a network 50 such as a LAN or WAN. The image forming apparatus 10 has various functions such as scanning, printing, and copying. The print server 20 manages an input print job and the image forming apparatus 10 connected via the network 50. The print server 20 can monitor the connected image forming apparatus 10 and the statuses of all print jobs, and can control suspension, setting change, and printing restart of a print job, or copying, movement, and deletion of a job. The file server 30 saves a database regarding variable data used in variable printing, for example, a customer database including customer data such as the destination, address, and name. The client PC 40 has a function of editing an application file and a function of supporting printing. Also, the client PC 40 has a function of monitoring the image forming apparatus 10 and print job which are managed in the print server 20, and a function of assisting control. The operator can confirm the job status and the like using the client PC 40. A general information processing apparatus is used as each of the print server 20, file server 30, and client PC 40.

<Arrangement of Image Forming Apparatus 10>

Figure 2:
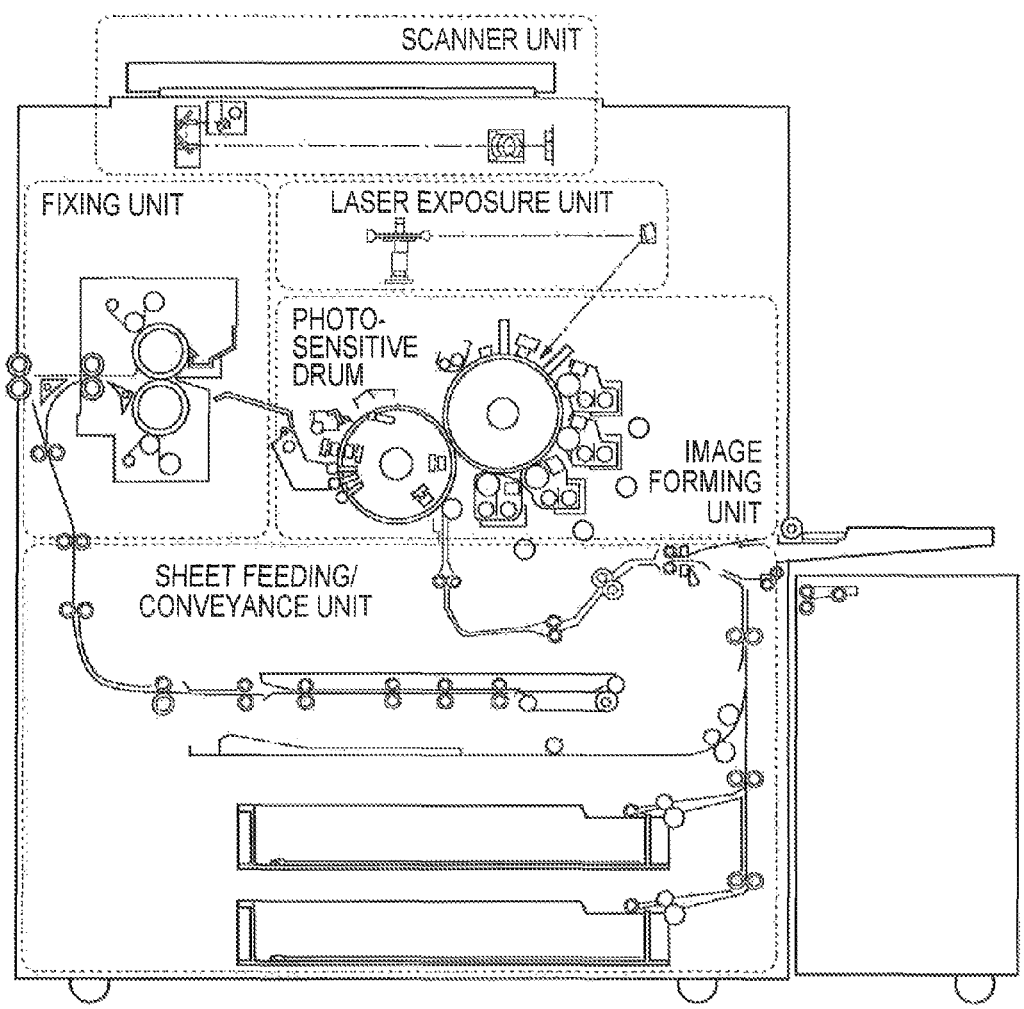
FIG. 2 is a sectional view showing the arrangement of an image forming apparatus.

The arrangement of an MFP serving as an embodiment of the image forming apparatus 10 will be explained with reference to FIG. 2. The MFP includes a scanner unit, a laser exposure unit, a photosensitive drum, an image forming unit, a fixing unit, a sheet feeding/conveyance unit, and a printer control unit (not shown) which controls these units. The scanner unit illuminates a document (printing medium) set on the document table to optically read the document image, and converts the image into an electrical signal to create image data. The laser exposure unit emits a beam such as a laser beam modulated in accordance with image data. The beam impinges on a rotating polyhedral mirror (polygon mirror) rotating at an equiangular velocity, and irradiates, as reflected scanning light, the photosensitive drum. The image forming unit forms an image by executing a series of electrophotographic processes. More specifically, the photosensitive drum is driven to rotate, and is charged by a charger. A latent image formed on the photosensitive drum by the laser exposure unit is developed with toner, and the toner image is transferred onto a sheet (paper). At this time, a small amount of toner which has not been transferred and remains on the photosensitive drum is recovered. While the sheet is wound at a predetermined position on a transfer belt and rotates four times, development units (development stations) storing magenta (M), cyan (C), yellow (Y), and black (K) toners are switched to repetitively execute the electrophotographic processes sequentially. After the four turns, the sheet bearing the full color toner image in the four colors is separated from the transfer drum and conveyed to the fixing unit. The fixing unit is formed from a combination of rollers and belts, and incorporates a heat source such as a halogen heater. The fixing unit fuses and fixes, by heat and pressure, the toner on the sheet on which the image forming unit has transferred the toner image. The sheet feeding/conveyance unit includes one or more sheet storages (paper sources) typified by a sheet cassette or paper deck. The sheet feeding/conveyance unit separates one of sheets in the sheet storage in accordance with an instruction from the printer control unit, and conveys it to the image forming unit and fixing unit. The sheet is wound around the transfer drum of the image forming unit, rotates four times, and then is conveyed to the fixing unit. During the four turns, toner images of the Y, M, C, and K colors mentioned above are transferred onto the sheet. When forming images on the two sides of the sheet, the sheet having passed through the fixing unit is controlled to pass through a conveyance path for conveying the sheet to the image forming unit again. The printer control unit communicates with an MFP control unit which controls the whole MFP, and executes control in accordance with an instruction from the MFP control unit. While managing the states of the scanner unit, laser exposure unit, image forming unit, fixing unit, and sheet feeding/conveyance unit, the printer control unit issues an instruction so that the overall apparatus can operate smoothly with harmony.

<Arrangement of Controller Unit of Image Forming Apparatus 10>

Figure 3:
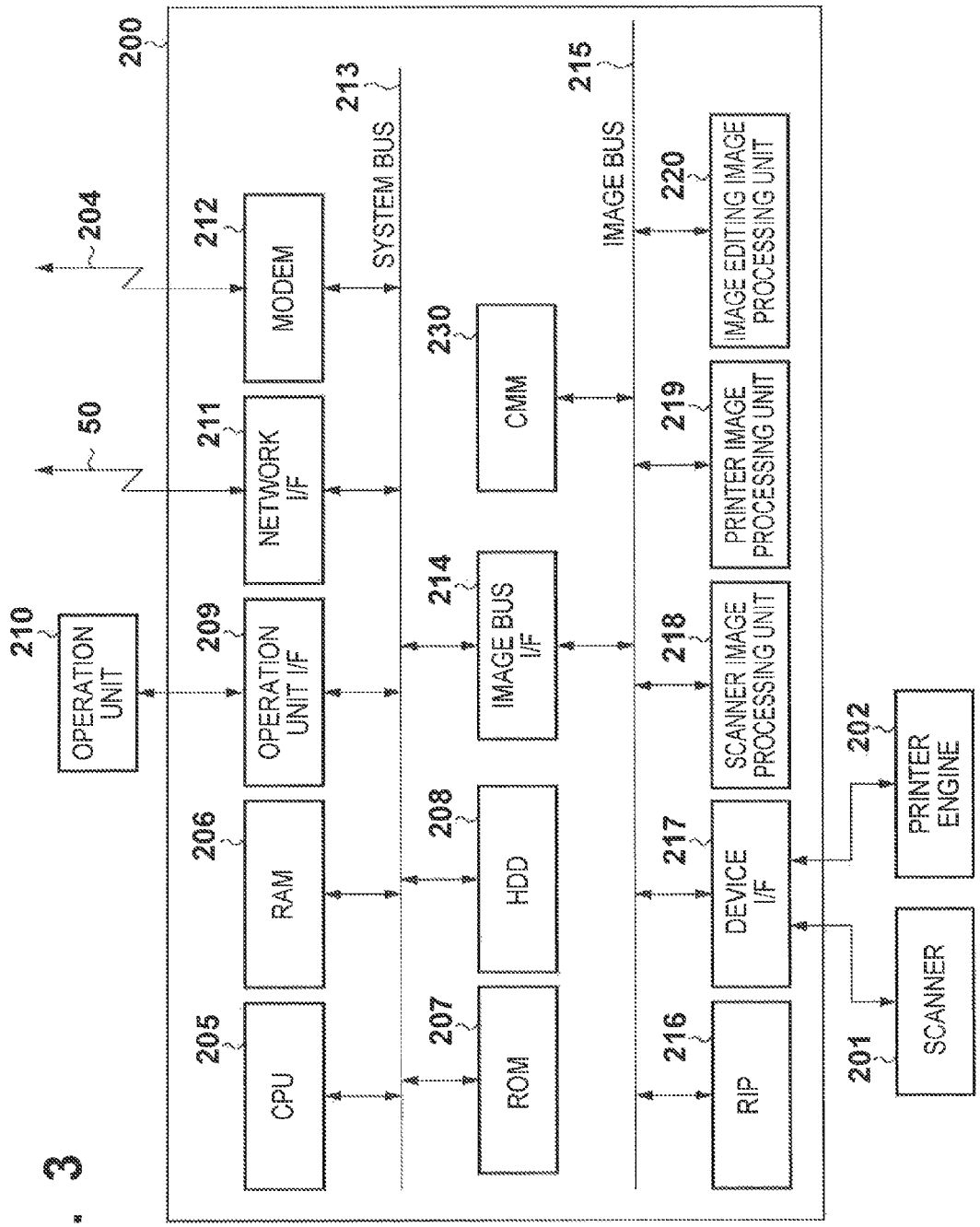
FIG. 3 is a block diagram showing the arrangement of the control unit of the image forming apparatus.

FIG. 3 is a block diagram exemplifying the arrangement of the control unit (controller) of the image forming apparatus 10 in the embodiment. A control unit 200 is connected to a scanner 201 serving as an image input device and a printer engine 202 serving as an image output device, and performs control for image data reading and printout. The control unit 200 is connected to the network 50 and a public line 204, and performs control for inputting/outputting image information and device information via the network 50. A CPU (Central Processing Unit) 205 controls the overall MFP. A RAM 206 is a system work memory for operating the CPU 205, and is an image memory for temporarily storing input image data. A ROM 207 is a boot ROM which stores a system boot program. An HDD (Hard Disk Drive) 208 stores system software for various processes, input image data, and the like. An operation unit I/F 209 is an interface unit for an operation unit 210 having a display screen capable of displaying image data and the like. The operation unit I/F 209 outputs operation screen data to the operation unit 210. The operation unit I/F 209 transfers, to the CPU 205, information input by the operator via the operation unit 210. A network interface 211 is implemented by a LAN card or the like, and connects to the network 50 to receive/output information from/to an external apparatus. A modem 212 connects to the public line 204, and receives/outputs information from/to an external apparatus. These units are arranged on a system bus 213.

An image bus I/F 214 is an interface for connecting the system bus 213 and an image bus 215 for transferring image data at high speed, and is a bus bridge which converts a data structure. A raster image processor (RIP) 216, device I/F 217, scanner image processing unit 218, printer image processing unit 219, image editing image processing unit 220, and color management module (CMM) 230 are connected to the image bus 215. The RIP 216 rasterizes a page description language (PDL) into a raster image. In general, RIP processing is used in two ways, that is, interpret processing of converting the page description language (PDL) into intermediate data (DL), and rendering processing of converting the page description language (PDL) into a raster image. In the present invention, RIPed data is rasterized into a raster image for descriptive convenience. However, the present invention targets even a form in which RIPed data is temporarily converted into intermediate data (DL). The device I/F 217 connects the scanner 201, printer engine 202, and control unit 200, and executes synchronous/asynchronous conversion of image data.

The scanner image processing unit 218 performs various processes such as correction, processing, and editing for image data input from the scanner 201. The printer image processing unit 219 performs processes such as correction and resolution conversion corresponding to the printer engine for image data to be printed out. The image editing image processing unit 220 performs various image processes such as rotation of image data and compression/decompression processing of image data. The CMM 230 is a dedicated hardware module for performing color conversion processing (also called color space conversion processing) based on the profile and calibration data for image data. The profile is information such as a function for converting color image data expressed in a device-dependent color space into color image data in a device-independent color space (for example, Lab). The calibration data is data for modifying the color reproduction characteristics of the scanner 201 and printer engine 202 in the image forming apparatus 10.

<Arrangement of Operation Unit 210 of Image Forming Apparatus 10>

Figure 4:
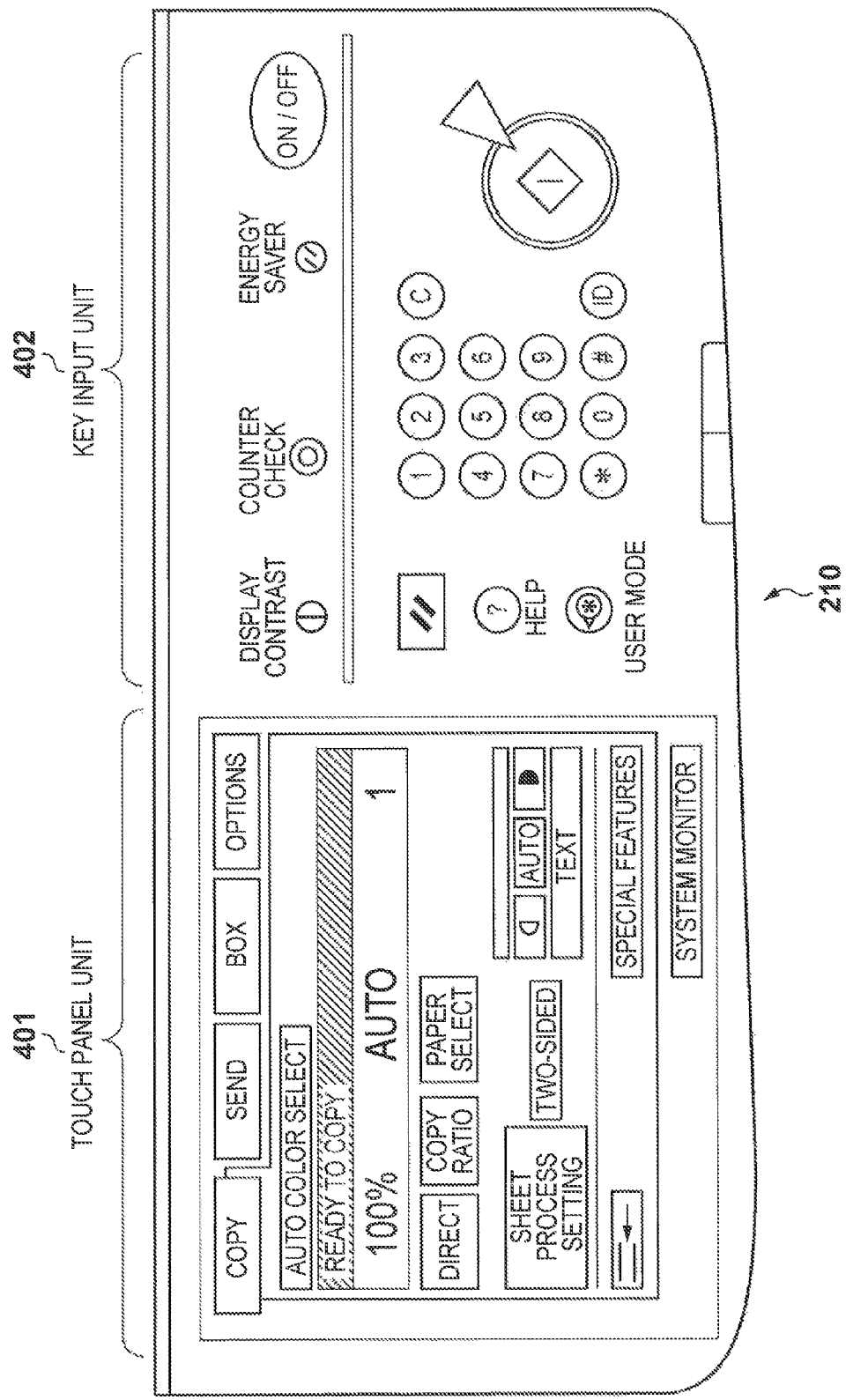
FIG. 4 is a view showing the arrangement of an operation unit.
Figure 5:
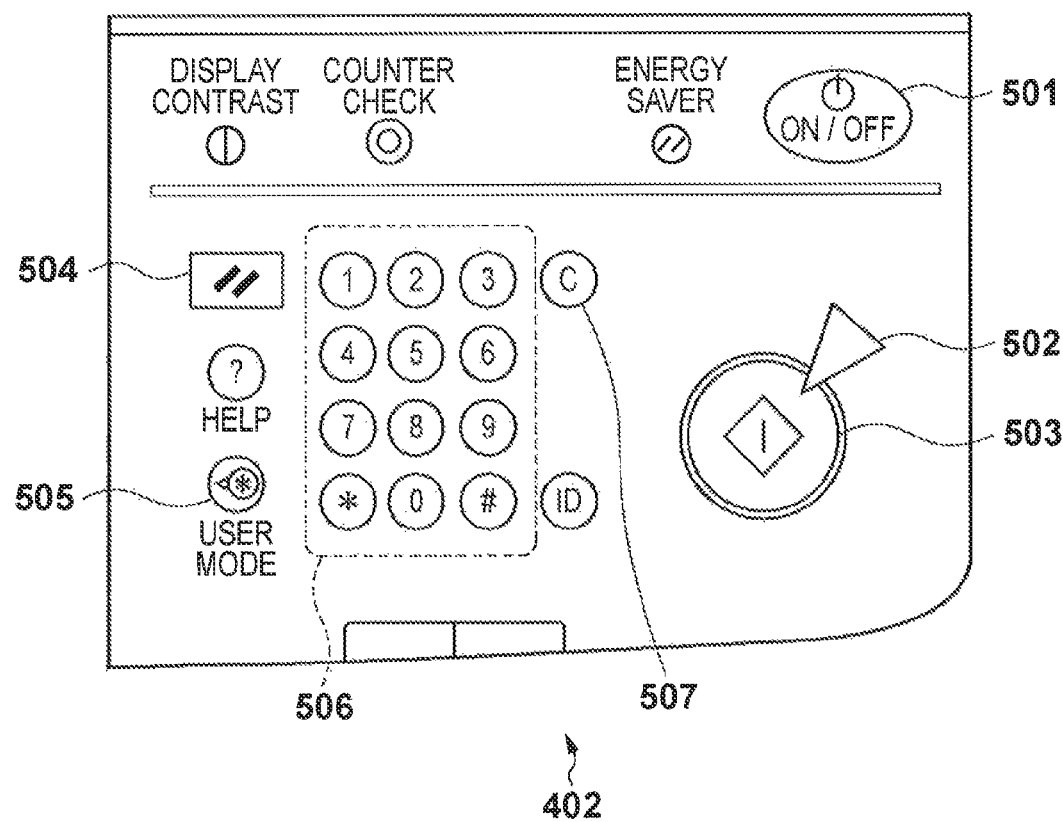
FIG. 5 is a view showing the arrangement of the operation unit.

The arrangement of the operation unit 210 of the image forming apparatus 10 will be explained with reference to FIGS. 4 and 5. As shown in FIG. 4, the operation unit 210 includes a key input unit 402 capable of accepting a user operation via a hard key, and a touch panel unit 401 serving as an example of a display unit capable of accepting a user operation via a soft key (display key). As shown in FIG. 5, the key input unit 402 includes an operation unit power switch 501. In response to a user operation to the switch 501, the CPU 205 controls to selectively switch between the standby mode and the sleep mode. Note that the standby mode is a normal operation mode, and the sleep mode is a state in which the program stops to suppress power consumption in wait for an interrupt for network printing, facsimile, and the like. The CPU 205 controls to be able to accept a user operation to the switch 501 when a main power switch (not shown) for supplying power to the overall system is ON. A start key 503 is a key capable of accepting an instruction from the user to cause the image forming apparatus to start a kind of job processing designated by the user, such as a copying operation or transmission operation for a job to be processed. A stop key 502 is a key capable of accepting an instruction from the user to cause the image forming apparatus to suspend accepted job processing. A ten-key pad 506 includes keys for allowing the user to enter various settings. A clear key 507 is a key for canceling various parameters such as those entered by the user via the ten-key pad 506. A reset key 504 is a key for invalidating all settings made by the user for a job to be processed, or accepting an instruction from the user to return set values to a default state. A user mode key 505 is a key for shifting to a user-specific system setting screen.

<Structure of Paper Management Table 601>

FIG. 6 is a table showing the structure of a paper management table 601 stored in the HDD 208 of the image forming apparatus 10. The paper management table 601 associates a paper ID 610, paper-specific attributes 620, job-specific attributes 630, and a provisional registration flag 640 with each other. The paper-specific attributes 620 and job-specific attributes 630 are formed from pieces of attribute information, that is, paper names 621 and 631, grammages 622 and 632, colors 623 and 633, surface properties 624 and 634, and shapes 625 and 635, respectively. The paper ID 610 is identification information which is uniquely determined for each paper type. The paper-specific attributes 620 are paper attributes representing paper features set for the paper type. The operator can operate the operation unit 210 to arbitrarily change the paper-specific attributes 620.

The job-specific attributes 630 are paper attributes which are designated by a job when the job automatically registers a paper type. When a paper type is registered by a method other than automatic registration, all the job-specific attributes 630 become "-" (none). When a job automatically registers a paper type, the job-specific attribute 630 of a parameter not designated by the job also becomes "-" (none). The provisional registration flag 640 is a flag representing whether the paper type is registered provisionally. A paper type automatically registered by a job is registered first as a provisionally registered paper type (paper type for which the provisional registration flag 640 becomes TRUE). When actually using the paper type for printing, the provisionally registered paper type changes to an actually registered paper type (paper type for which the provisional registration flag 640 becomes FALSE). Each of the paper names 621 and 631 is an arbitrary character string from which the operator identifies the paper type. Each of the grammages 622 and 632 is an attribute indicating the weight per unit of the paper type, and the unit is g/m². Each of the colors 623 and 633 is an attribute indicating the color of the paper type. Each of the surface properties 624 and 634 is an attribute indicating the surface property of the paper type, and takes a value such as wood-free paper, recycled paper, one-side coated, two-side coated, or carbonless. Each of the shapes 625 and 635 is an attribute indicating the shape of the paper type, and takes a value such as normal, tab paper, or punched paper. In this manner, the paper management table 601 stores the job-specific attributes 630. This allows searching for a medium for which paper attributes designated by a job match the job-specific attributes 630, and setting the medium as a paper type candidate for use in the job.

<Structure of Prohibition Management Table 701>

Figure 7:
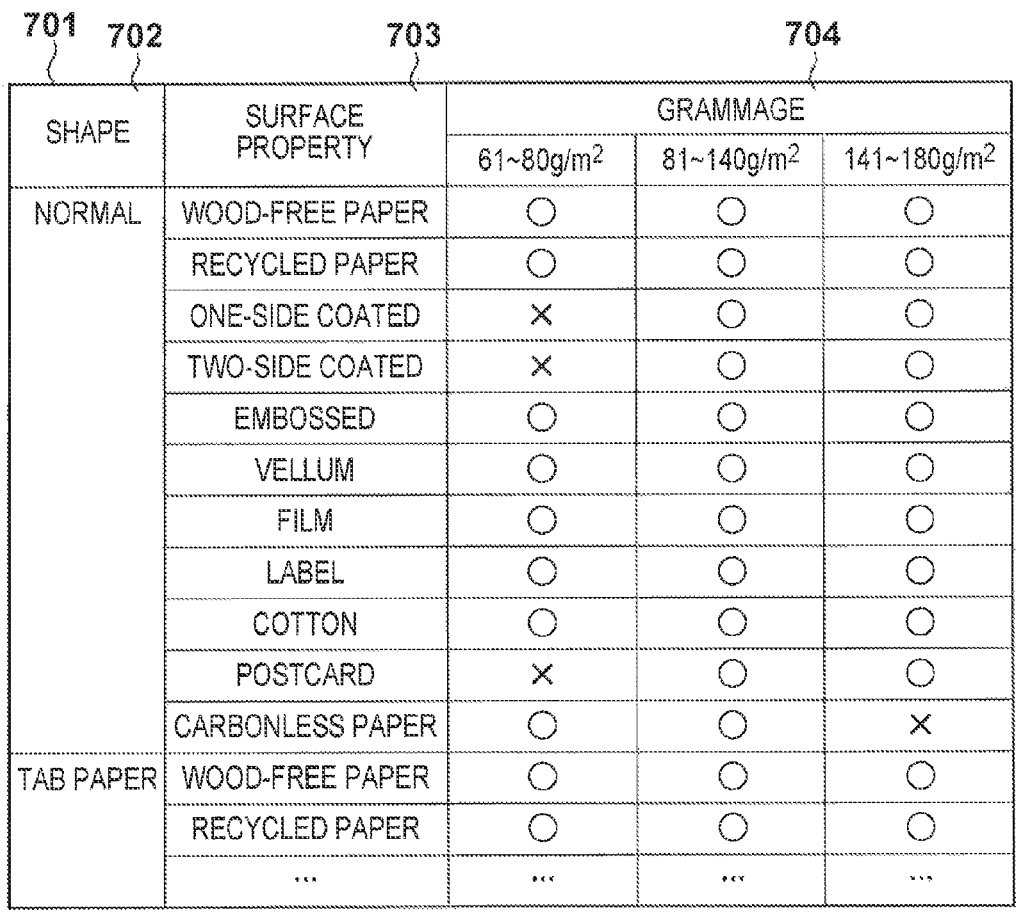
FIG. 7 is a table exemplifying a prohibition management table.

FIG. 7 is a table showing the structure of a prohibition management table 701 stored in the HDD 208 of the image forming apparatus 10. The prohibition management table 701 manages whether a combination of a shape 702, surface property 703, and grammage 704 can be registered in the paper management table 601. For example, x is marked for a combination of shape: normal, surface property: one-side coated, and grammage: 61 to 80 g/m². This means that a paper type having these paper attributes cannot be registered in the paper management table 601.

<Data to be Processed by Image Forming Apparatus 10>

FIG. 8 exemplifies an excerpt of PostScript (Registered Trademark) data serving as a kind of data to be processed by the image forming apparatus 10. PostScript data 801 designates, by using a setpagedevice operator, paper attribute designations 802 including the size, name, grammage, color, surface property, and shape of paper for use in a job. The paper attribute designation 802 can be designated for each page. A description of details of the PostScript specifications will be omitted. Note that the present invention targets not only the form shown in FIG. 8, but also a paper attribute designation form different from the example of FIG. 8 or the form of PDL data+job ticket (for example, JDF).

<Processing by Image Forming Apparatus 10>

Figure 9:
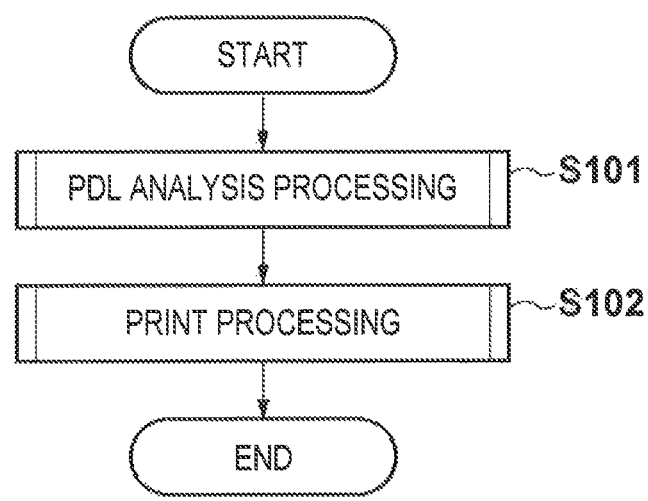
FIG. 9 is a flowchart showing an outline of a processing sequence by the image forming apparatus.

Processing by the image forming apparatus 10 in the embodiment will be explained with reference to FIG. 9. In step S101, the image forming apparatus 10 performs PDL analysis processing. Details of PDL analysis processing will be described later with reference to FIG. 10. In step S102, the image forming apparatus 10 performs print processing. Details of print processing will be described later with reference to FIG. 11. After the end of these processes, processing by the image forming apparatus 10 ends.

<PDL Analysis Processing>

Figure 10:
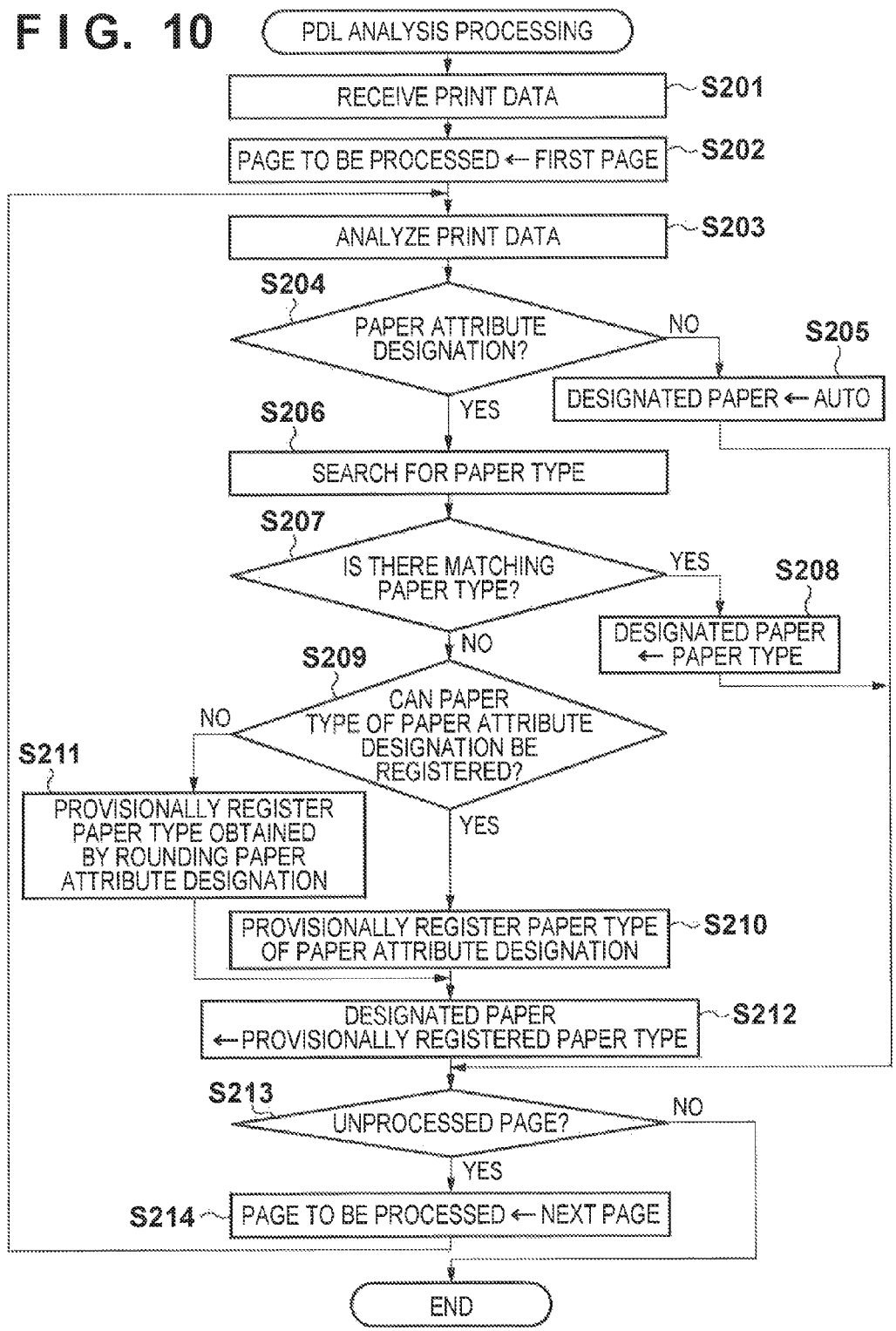
FIG. 10 is a flowchart showing a PDL analysis processing sequence.

Details of PDL analysis processing in step S101 will be explained with reference to FIG. 10. In step S201, the CPU 205 acquires, via the network I/F 211, print data sent via the network 50, and stores it in the HDD 208. In step S202, the CPU 205 sets the first page as the page to be processed. In step S203, the CPU 205 analyzes the page to be processed in the received print data. In step S204, the CPU 205 determines whether the page to be processed has the paper attribute designation 802 including the paper name, grammage, color, surface property, and shape. If the CPU 205 determines that the page to be processed does not have the paper attribute designation 802, the process advances to step S205. If the CPU 205 determines that the page to be processed has the paper attribute designation 802, the process advances to step S206.

If the CPU 205 determines that the page to be processed does not have the paper attribute designation 802 (NO in step S204), it automatically sets designated paper in step S205. After the end of this processing, the process advances to step S213. If the CPU 205 determines that the page to be processed has the paper attribute designation 802 (YES in step S204), it searches for a paper type in step S206. In this search, the paper management table 601 is searched for a paper type having the paper-specific attributes 620 which satisfy the conditions of attributes designated by the paper attribute designation 802. If some paper attributes are not designated by the paper attribute designation 802, they are considered arbitrary. In step S207, the CPU 205 determines whether there is a paper type matching the paper attribute designation 802. If the CPU 205 determines that there is a paper type matching the paper attribute designation 802, the process advances to step S208. If the CPU 205 determines that there is no paper type matching the paper attribute designation 802, the process advances to step S209. If the CPU 205 determines that there is a paper type matching the paper attribute designation 802 (YES in step S207), it sets designated paper as the paper type in step S208. If a plurality of paper types are detected, all of them are set as designated paper in the embodiment. As another embodiment, one of detected paper types may be set as designated paper. For example, a paper type having a highest degree of matching may be set as designated paper, or one of paper types in paper sources may be set as designated paper. In this case, the degree of matching is calculated using, for example, weighted addition for each paper attribute item in accordance with:

$$\text{degree of matching}(m1, m2) = \sum_{P \in S} w_P Eq(m1_P, m2_P) \quad (1)$$

where m1 and m2 are combinations of paper attributes for which the degree of matching is to be calculated, and S is S={paper name, grammage, color, surface property, shape}. $W_P$ is the weight of each paper attribute. For example, W (paper name)=1.0, W (grammage)=0.1, W (color)=0.2, W (surface property)=0.15, and W (shape)=0.4. $Eq(m1_p, m2_p)$ is "1" when $m1_p = m2_p$ or $m1_p$ or $m2_p$ is arbitrary. $Eq(m1_p, m2_p)$ is "0" when $m1_p$ and $m2_p$ differ from each other.

After the end of this processing, the process advances to step S213. If the CPU 205 determines that there is no paper type matching the paper attribute designation 802 (NO in step S207), it determines in step S209 whether the paper type of the paper attribute designation 802 can be registered in the paper management table 601. In this determination, it is determined whether the prohibition management table 701 allows registering the combination of the paper attribute designation 802. If some paper attributes are not designated, the undesignated paper attributes are considered arbitrary, and it is determined whether there is a registrable combination. If the CPU 205 determines that the combination of the paper attribute designation 802 is registrable, the process advances to step S210. If the CPU 205 determines that the combination of the paper attribute designation 802 is not registrable, the process advances to step S211.

If the CPU 205 determines that the combination of the paper attribute designation 802 is registrable (YES in step S209), it provisionally registers, in the paper management table 601 in step S210, a paper type having the values of the designated paper attributes as the paper-specific attributes 620. At this time, if the paper attribute designation 802 does not designate some paper attributes, the paper-specific attributes 620 of the undesignated paper attributes are considered arbitrary, and a combination of registrable parameters is registered. The job-specific attributes 630 of the paper type are set to have designated paper attribute values. When the paper attribute designation 802 does not designate some paper attributes, the job-specific attributes 630 of the undesignated paper attributes become "-" (none). The value of the provisional registration flag 640 becomes TRUE for the paper type provisionally registered by this processing. By this processing, when a designated paper type has not been registered in advance in the image forming apparatus 10, the paper is automatically registered. The operator need neither manually register paper nor input a job again, and can obtain a product he wants by a smaller number of procedures than those in the conventional technique. After the end of the processing, the process advances to step S212.

If the CPU 205 determines that the combination of the paper attribute designation 802 is not registrable (NO in step S209), it provisionally registers, in the paper management table 601 in step S211, a paper type having, as the paper-specific attributes 620, values obtained by rounding processing for the paper attribute designation 802. The rounding processing is processing of changing some or all values in the paper attribute designation 802 to values registrable in the paper management table 601. In this processing, for example, the degree of matching to the paper attribute designation 802 is calculated using degree of matching calculation equation (1) for all paper attribute combinations which are defined to be registrable in the prohibition management table 701. Then, the combination is rounded to a paper attribute combination having a highest degree of matching. As another example of the rounding processing, all paper attributes are rounded to default values regardless of the contents of the paper attribute designation 802. The default values are predetermined values held in advance in the image forming apparatus 10. The default values are, for example, paper name: SystemDefinedX (X is a unique character string which does not coincide with another paper type), grammage: $100$ g/m$^2$, color: white, surface property: normal, and shape: normal. The job-specific attributes 630 of the paper type provisionally registered by this processing have designated paper attribute values. If the paper attribute designation 802 does not designate some paper attributes, the job-specific attributes 630 of the undesignated paper attributes become none ("-"). The value of the provisional registration flag 640 becomes TRUE for the paper type provisionally registered by this processing. By this processing, when a designated paper type has not been registered in advance in the image forming apparatus 10 and the paper attribute designation 802 cannot be registered in the image forming apparatus 10, a paper type rounded to registrable values is automatically registered. The operator need neither manually register paper nor input a job again, and can obtain a product he wants by a smaller number of procedures than those in the conventional technique. After the end of the processing, the process advances to step S212.

In step S212, the CPU 205 sets, as the designated paper, the paper type provisionally registered in step S210 or S211. In step S213, the CPU 205 determines whether an unprocessed page remains in the received print data. If the CPU 205 determines that an unprocessed page remains, the process advances to step S214. If the CPU 205 determines that no unprocessed page remains, PDL analysis processing ends. If the CPU 205 determines that an unprocessed page remains in the received print data (YES in step S213), it sets the next page as the page to be processed in step S214. After the end of the processing, the process returns to step S203 to keep processing the remaining pages.

By the above-described processing, when a designated paper type has not been registered in advance in the image forming apparatus 10, the paper is automatically registered. The operator need neither manually register paper nor input a job again, and can obtain a product he wants by a smaller number of procedures than those in the conventional technique.

Also, when a designated paper type has not been registered in advance in the image forming apparatus 10 and the paper attribute designation 802 cannot be registered in the image forming apparatus 10, a paper type rounded to paper attributes registrable in the image forming apparatus 10 is automatically registered. The operator need neither manually register registrable paper nor input a job again, and can obtain a product he wants by a smaller number of procedures than those in the conventional technique.

<Print Processing>

Figure 11:
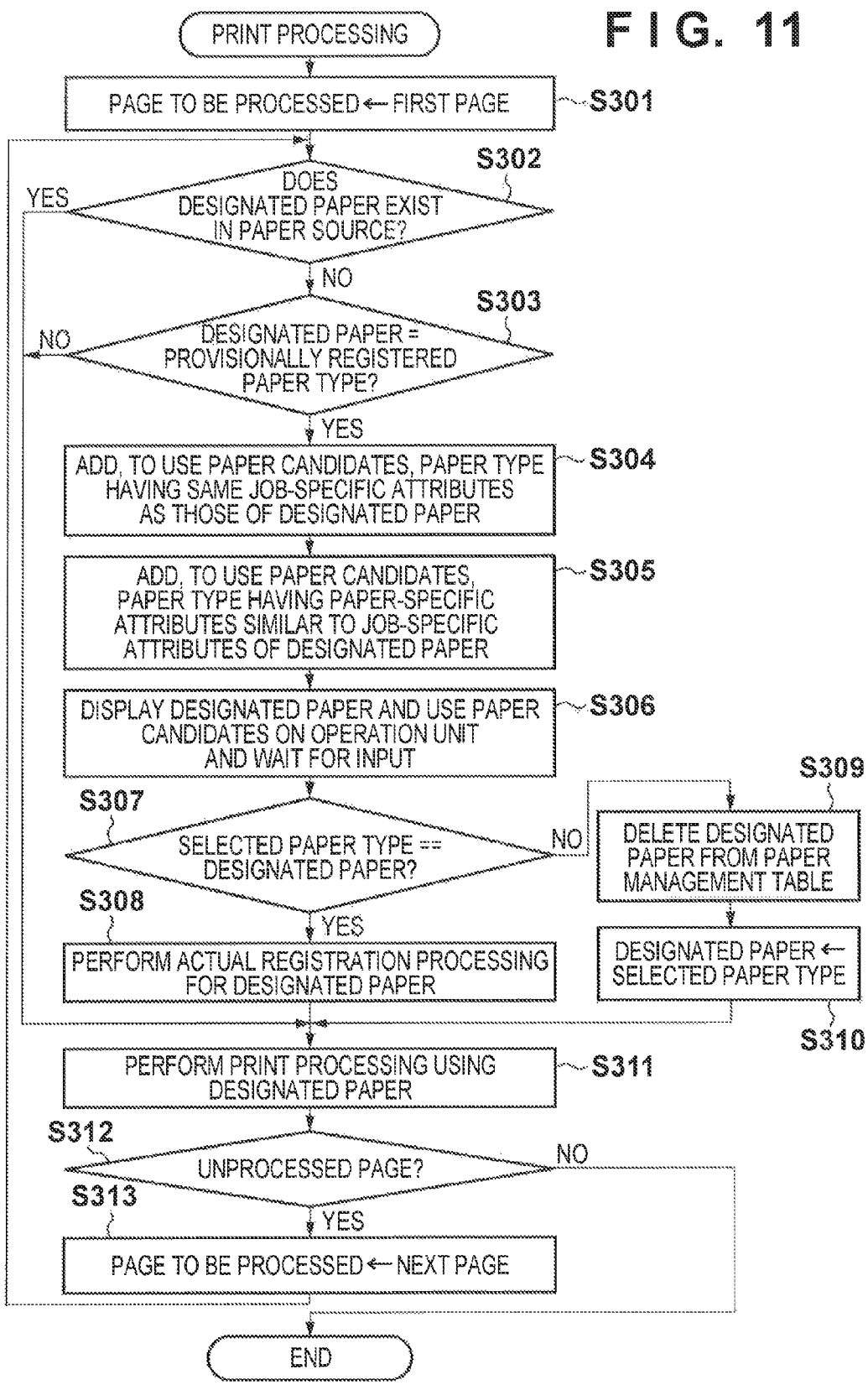
FIG. 11 is a flowchart showing a print processing sequence.

Details of print processing in step S102 in the embodiment will be described with reference to FIG. 11. In step S301, the CPU 205 sets the first page as the page to be processed. In step S302, the CPU 205 determines whether the designated paper exists in the paper source. The designated paper is paper set in one of steps S205, S208, and S212. When the designated paper includes a plurality of paper types and one of the paper types exists in the paper source, the CPU 205 determines that the designated paper exists in the paper source. If the CPU 205 determines that the designated paper exists in the paper source, the process advances to step S311. If the CPU 205 determines that the designated paper does not exist in the paper source, the process advances to step S303.

If the CPU 205 determines that the designated paper does not exist in the paper source (NO in step S302), it determines in step S303 whether the designated paper is provisionally registered paper. In this determination, if the provisional registration flag 640 is TRUE in the paper management table 601 for the paper type of the designated paper, it is determined that the designated paper is provisionally registered paper. If the CPU 205 determines that the designated paper is not provisionally registered paper, the process advances to step S311. If the CPU 205 determines that the designated paper is provisionally registered paper, the process advances to step S304.

If the CPU 205 determines that the designated paper is provisionally registered paper (YES in step S303), it adds, to use paper candidates in step S304, a paper type having the same job-specific attributes 630 as those of the designated paper. If a plurality of paper types hit, all the hit paper types are added to use paper candidates. In step S305, the CPU 205 adds, to use paper candidates, a paper type having the paper-specific attributes 620 close to the job-specific attributes 630 of the designated paper. In this processing, a predetermined number of paper types having a high degree of matching to the job-specific attributes 630 of the designated paper are selected from paper types registered in the paper management table 601, and added to use paper candidates. The degree of matching is calculated in accordance with degree of matching calculation equation (1).

In step S306, the CPU 205 displays, on the operation unit 210, a paper selection screen containing the designated paper and use paper candidates, and prompts the operator to select paper for use in printing. FIG. 12 exemplifies the paper selection screen (selection screen display). The operator can freely select a paper type for use in printing from 1. paper types provisionally registered this time, 2. paper types automatically registered by previous jobs each having the same designation, and 3. paper types having paper-specific attributes similar to the designated paper attributes. By this processing, when a designated paper type has not been registered in advance in the image forming apparatus 10, a proper paper type can be selected in accordance with the operator intension. This can improve operability and allows to easily obtain a product the operator wants.

When the operator presses a paper edit button 1201 displayed on the operation unit 210 in FIG. 12, the CPU 205 displays a paper edit screen in FIG. 13 on the operation unit 210 (edit screen display). On the paper edit screen, the operator can confirm and edit the paper-specific attributes 620 of the provisionally registered paper type. With this arrangement, when the designated paper type has not been registered in advance in the image forming apparatus 10, an automatically registered paper type can be customized before printing and then used. The operator can customize paper to be actually used, and then use it in printing, obtaining a product he wants by a smaller number of procedures than those in the conventional technique. In step S307, the CPU 205 determines whether the selected paper type is designated paper. If the selected paper type is designated paper, the process advances to step S308. If the selected paper type is not designated paper, the process advances to step S309.

If the selected paper type is designated paper (YES in step S307), the CPU 205 executes designated paper actual registration processing in step S308. In this processing, the provisional registration flag 640 for the paper type in the paper management table 601 is set to FALSE. After the end of this processing, the process advances to step S311. If the selected paper type is not designated paper (NO in step S307), the CPU 205 deletes the designated paper from the paper management table 601 in step S309. By this processing, when a provisionally registered paper type is not used in printing, it can be deleted from the paper management table 601. This can prevent registration of many automatically registered paper types which have never been used.

In step S310, the CPU 205 sets a paper type selected by the operator as the designated paper. In step S311, the CPU 205 performs print processing using the designated paper. When a plurality of paper types are set as the designated paper, one of them is used to perform print processing. If the designated paper does not exist in the paper source, the operation unit 210 displays a sheet feeding request screen (not shown) to prompt the operator to feed a sheet. In step S312, the CPU 205 determines whether an unprinted page remains. If the CPU 205 determines that an unprinted page remains, the process advances to step S313. If the CPU 205 determines that all pages have been printed, print processing ends. If the CPU 205 determines that an unprocessed page remains in the received print data (YES in step S312), the CPU 205 sets the next page as the page to be processed in step S313. After the end of this processing, the process returns to step S302 to keep processing the remaining pages.

By the above-described processing, when a designated paper type has not been registered in advance in the image forming apparatus 10, a proper paper type can be selected in accordance with the operator intension. The operator can freely select a paper type for use in printing from 1. paper types provisionally registered this time, 2. paper types automatically registered by previous jobs each having the same designation, and 3. paper types having paper-specific attributes similar to the designated paper attributes. When a designated paper type has not been registered in advance in the image forming apparatus 10, a proper paper type can be selected in accordance with the operator intention. This can improve operability and allows to easily obtain a product the operator wants. Also, by the above processing, when the designated paper type has not been registered in advance in the image forming apparatus 10, an automatically registered paper type can be customized before printing and then used. The operator can customize paper to be actually used, and then use it in printing, obtaining a product he wants by a smaller number of procedures than those in the conventional technique. By the above-described processing, when a provisionally registered paper type has not been actually used in printing, it is deleted from the paper management table 601. This can prevent registering, in the paper management table 601, many automatically registered paper types which have never been used.

In the embodiment, the operation unit 210 displays all of 1. provisionally registered paper types, 2. paper types automatically registered by previous jobs each having the same designation, and 3. paper types having paper-specific attributes similar to the designated paper attributes. However, the target of the present invention is not limited to this arrangement. For example, it can also be configured to prompt the operator to select a paper type for use in printing from paper types in one of 1 to 3, or either 1 or 2. For example, it can also be configured to automatically feed a paper type contained in one of 1 to 3 without the mediacy of an operator operation. Although PDL analysis processing and print processing are executed separately in the embodiment, the target of the present invention is not limited to this arrangement. For example, PDL analysis processing and print processing may be pipeline processes (RIP-WHILE-PRINT). In the embodiment, search and registration of a paper type in the paper management table 601 are executed in PDL analysis (step S101), but may be performed in printing (step S102). In the embodiment, a paper attribute-designated paper type is provisionally registered and then edited by the operator. Alternatively, the paper type may be registered after editing by the operator.

As described above, according to the first embodiment, when paper designated by a job has not been registered in advance in the image forming apparatus, designated paper can be automatically registered in the image forming apparatus. When paper designated by a job has not been registered in advance in the image forming apparatus, the operator need neither manually register paper nor input a job again, and can obtain a product he wants by a smaller number of procedures than those in the conventional technique.

Second Embodiment

<Arrangement of Printing System>

Figure 14:
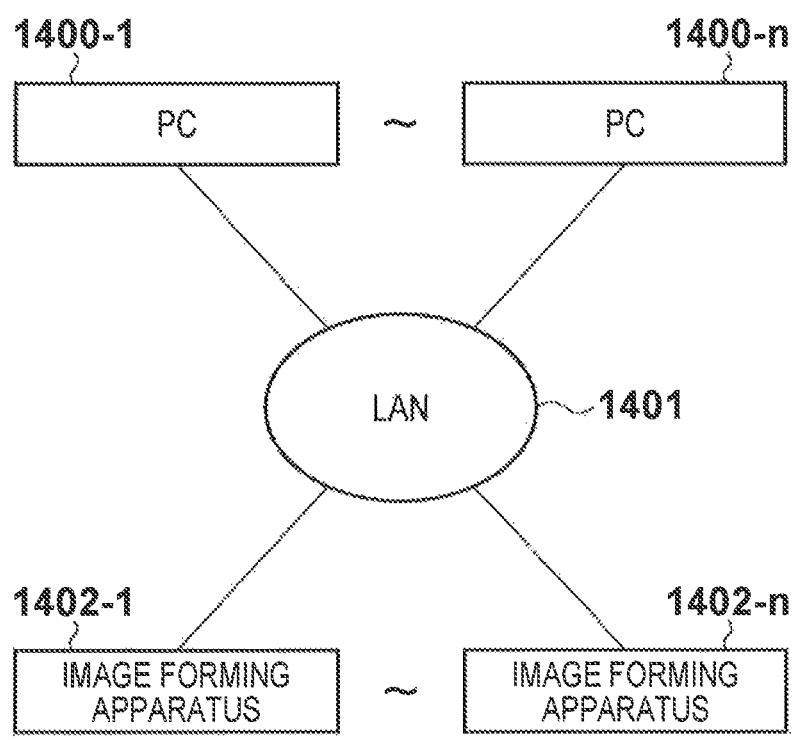
FIG. 14 is a view exemplifying the arrangement of a printing system according to an embodiment.

The arrangement of a printing system according to the second embodiment will be described with reference to FIG. 14. As shown in FIG. 14, in the printing system, a plurality of information processing apparatuses 1400, that is, 1400-1 to 1400-*n* are communicably connected to a plurality of image forming apparatuses 1402, that is, 1402-1 to 1402-*n* via a LAN 1401. Note that the embodiment assumes a personal computer (PC) as an example of the information processing apparatuses 1400-1 to 1400-*n*. Each of the image forming apparatuses 1402-1 to 1402-*n* suffices to be an apparatus which outputs an image onto a printing medium (paper), such as an MFP (Multi-Function Printer), SFP (Single-Function Printer), or facsimile apparatus.

<Arrangement of Image Forming Apparatus>

Figure 15A:
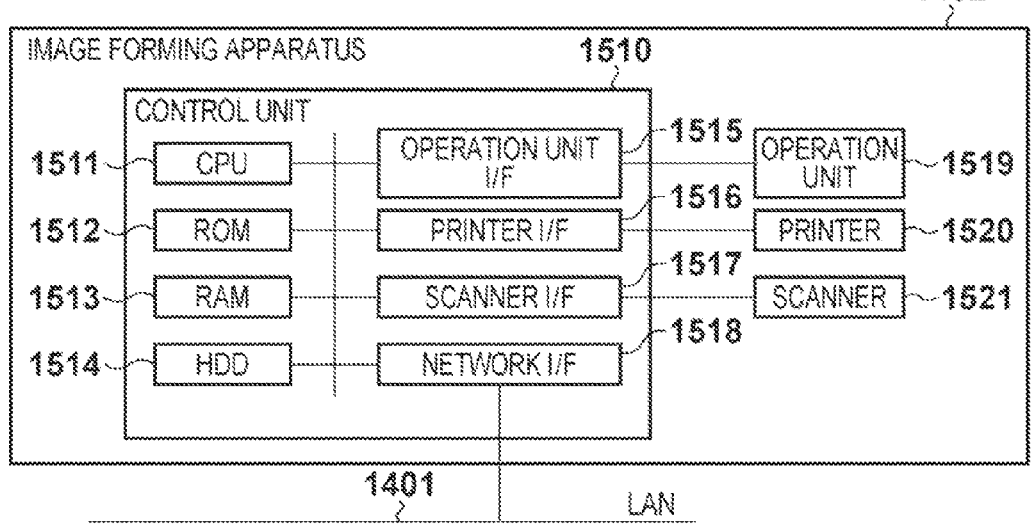
FIGS. 15A and 15B are block diagrams exemplifying the arrangement of an image forming apparatus according to the embodiment.
Figure 15B:
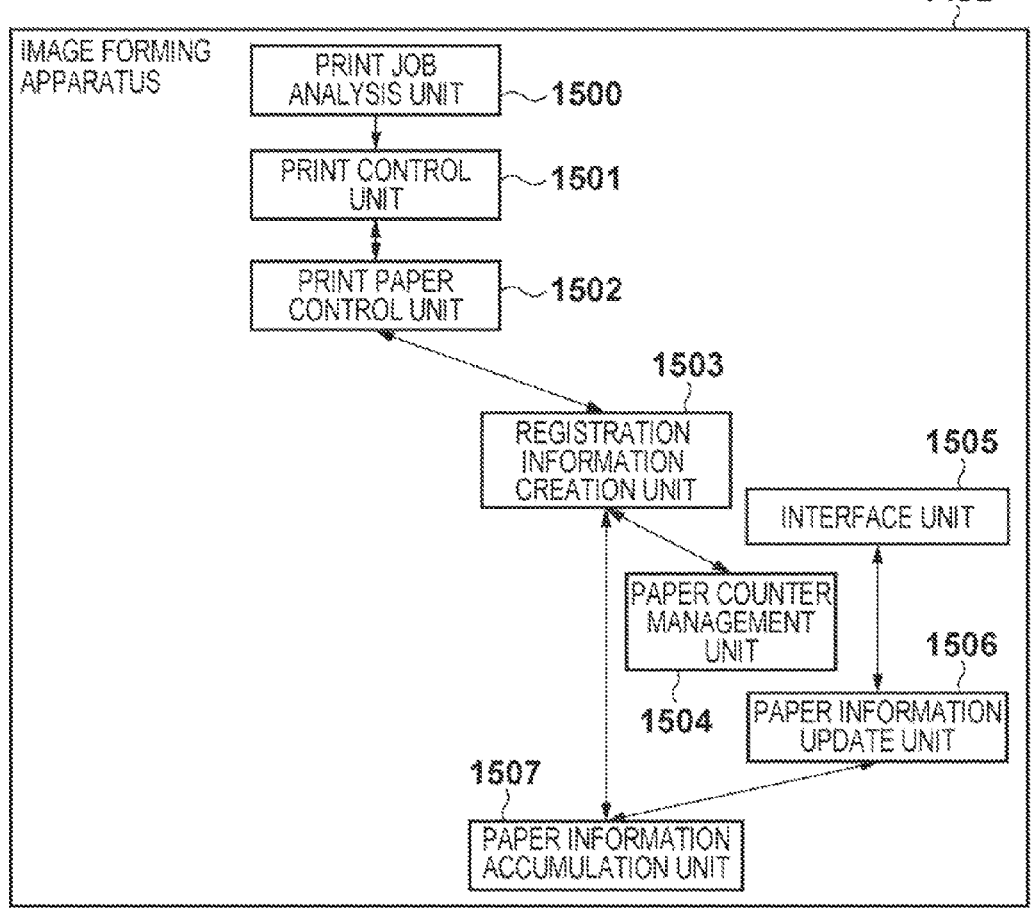

The arrangement of the image forming apparatus 1402 shown in FIG. 14 will be explained with reference to FIGS. 15A and 15B. The image forming apparatus 1402 includes a control unit 1510, operation unit 1519, printer 1520, and scanner 1521. The control unit 1510 includes a CPU 1511, ROM 1512, RAM 1513, HDD 1514, operation unit I/F 1515, printer I/F 1516, scanner I/F 1517, and network I/F 1518. The control unit 1510 including the CPU 1511 executively controls the operation of the overall image forming apparatus 1402. The CPU 1511 reads out a control program stored in the ROM 1512, and performs various control operations such as reading control and transmission control. The RAM 1513 is used as a temporary storage area such as the main memory and work area of the CPU 1511.

The HDD 1514 stores image data, various programs, or various information tables. The operation unit I/F 1515 connects the operation unit 1519 and control unit 1510. The operation unit 1519 includes a liquid crystal display unit having a touch panel function, and a keyboard, and accepts an input from the user. The printer I/F 1516 connects the printer 1520 and control unit 1510. Image data to be printed by the printer 1520 is transferred from the control unit 1510 via the printer I/F 1516, and printed on a printing medium by the printer 1520. The scanner I/F 1517 connects the scanner 1521 and control unit 1510. The scanner 1521 reads an image on a document to generate image data, and outputs the image data to the control unit 1510 via the scanner I/F 1517. The network I/F 1518 connects the control unit 1510 (image forming apparatus 1402) to the LAN 1401. The network I/F 1518 transmits image data and information to an external apparatus on the LAN 1401, and receives various kinds of information from an external apparatus on the LAN 1401.

The functional arrangement of the image forming apparatus 1402 will be explained. The image forming apparatus 1402 includes, as functional components, a print job analysis unit 1500, print control unit 1501, print paper control unit 1502, registration information creation unit 1503, paper counter management unit 1504, interface unit 1505, paper information update unit 1506, and paper information accumulation unit 1507. The print job analysis unit 1500 is an interpreter which analyzes a print job requested by the PC 1400. The description format of a print job to be transmitted from the PC 1400 is not designated. According to the embodiment, a printing medium (to be referred to as paper) to be printed is designated using paper information. The paper information is information of each attribute (attribute information) such as the name, size, surface property, feature, weight, or color of paper, or a combination of them. In this embodiment, the paper information contains attribute information about the name, size, surface property, feature, weight, and color. However, the present invention is not limited to this.

The print control unit 1501 receives the analysis result of the print job analysis unit 1500, and determines parameters necessary for printing. The parameters to be determined include paper for use in printing. The print paper control unit 1502 controls paper to be actually used in printing. Under the control of the print control unit 1501, the print paper control unit 1502 receives a job analysis result, and executes print paper determination processing of determining paper for use in printing from designated attribute information. The print paper determination processing sequence by the print paper control unit 1502 will be described later with reference to FIG. 16.

The registration information creation unit 1503 creates registration information for registering paper information. When creating registration information, the registration information creation unit 1503 executes attribute complementation processing of complementing the attribute value of attribute information not designated by a print job. The attribute complementation processing sequence by the registration information creation unit 1503 will be described later with reference to FIG. 17. When creating registration information, the registration information creation unit 1503 executes paper name creation processing of creating a paper name. The paper name creation processing sequence by the registration information creation unit 1503 will be described later with reference to FIG. 18.

The paper counter management unit 1504 counts and records the number of sheets used in printing for each attribute value combination. Note that not all combinations need be stored. For example, the mass (grammage) may have a predetermined range. Also, combinations that occur less frequently need not be counted or can be counted together. The count information may contain attribute values such as the size and color not present in the example shown in FIG. 19. In this case, when creating registration information by the registration information creation unit 1503, these attribute values are determined based on the count information.

The interface unit 1505 is a user interface including an input key and touch panel. The user can display paper information registered in the image forming apparatus 1402 and input update information to paper information via the interface unit 1505. Based on update information input via the interface unit 1505, the paper information update unit 1506 updates paper information registered in the paper information accumulation unit 1507. The paper information accumulation unit 1507 holds all pieces of registered paper information. Note that the paper information accumulation unit 1507 is an example of the paper information storage arrangement. The image forming apparatus 1402 includes a plurality of paper cassettes, and sheets can be set in the paper cassettes. The paper information accumulation unit 1507 holds even a combination of a paper cassette and paper information representing paper set in the paper cassette.

<Print Paper Determination Processing>

Figure 16:
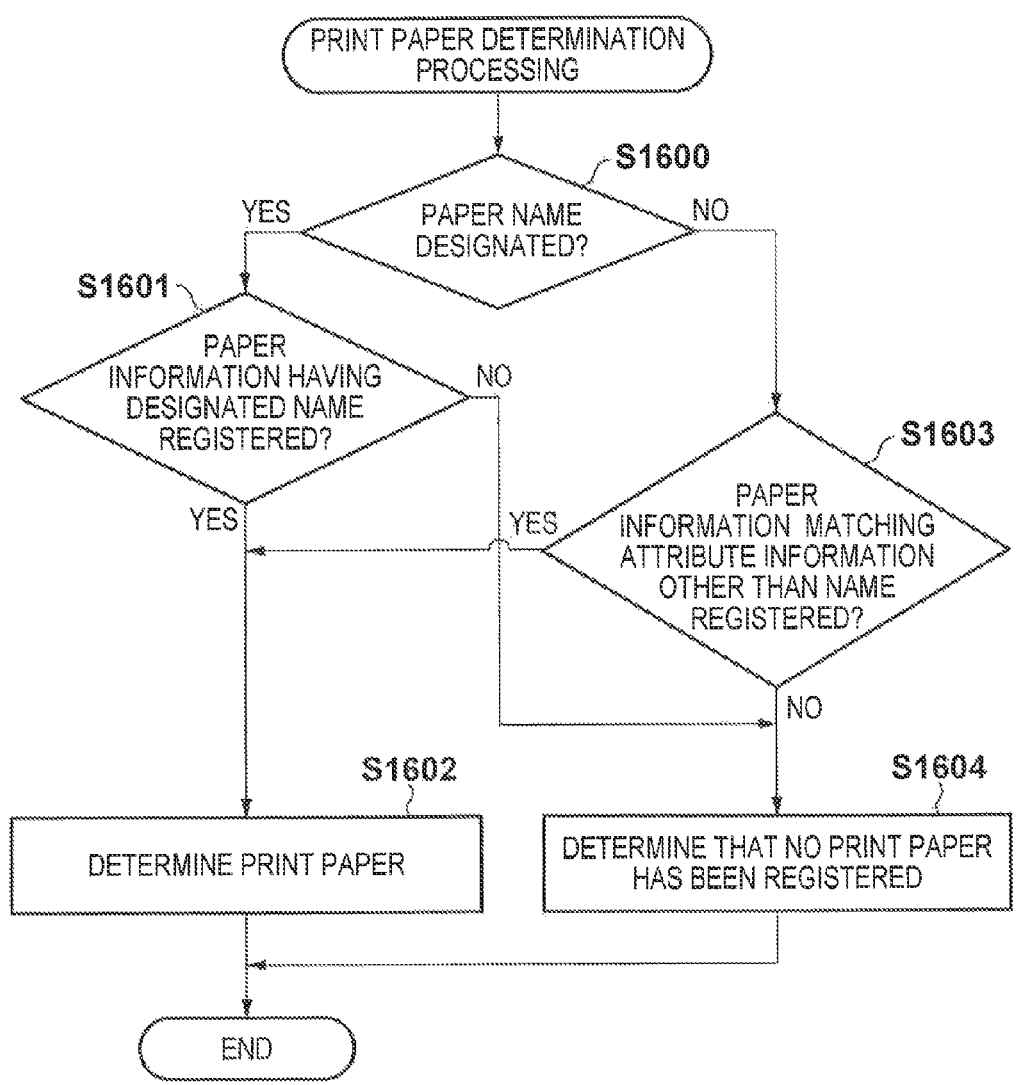
FIG. 16 is a flowchart showing a print paper determination processing sequence by the image forming apparatus according to the embodiment.

The processing sequence of print paper determination processing by the print paper control unit 1502 will be explained with reference to FIG. 16. The following processing is implemented by reading out a control program stored in advance in the ROM 1512 or HDD 1514, and executing it by the CPU 1511. In step S1600, the print paper control unit 1502 determines, based on the analysis result of a print job, whether a paper name has been designated. If a paper name has been designated, the process advances to step S1601, and the print paper control unit 1502 searches for paper information using the paper name and determines whether paper information having the same name as the designated name has been registered. In step S1601, the search condition does not contain attribute information other than the name. If paper information matching the designated name has been registered and the attribute value of another attribute information does not match the search result, the print paper control unit 1502 determines paper indicated by the paper information as paper for use in printing in step S1602, and the process ends. If the print paper control unit 1502 determines in step S1601 that paper information matching the designated name has not been registered, it determines that designated paper information has not been registered, and the process advances to step S1604.

If the print paper control unit 1502 determines in step S1600 that no name has been designated, the process advances to step S1603, and the print paper control unit 1502 searches for paper information using attribute information other than the name and determines whether paper information matching all pieces of attribute information other than the name has been registered. If the print paper control unit 1502 determines that paper information matching all pieces of attribute information other than the name has been registered, the process advances to step S1602, and the print paper control unit 1502 determines paper indicated by the paper information as paper for use in printing. Then, the process ends. If the print paper control unit 1502 determines that paper information matching all pieces of attribute information other than the name has not been registered, the process advances to step S1604 and ends.

<Attribute Complementation Processing>

Figure 17:
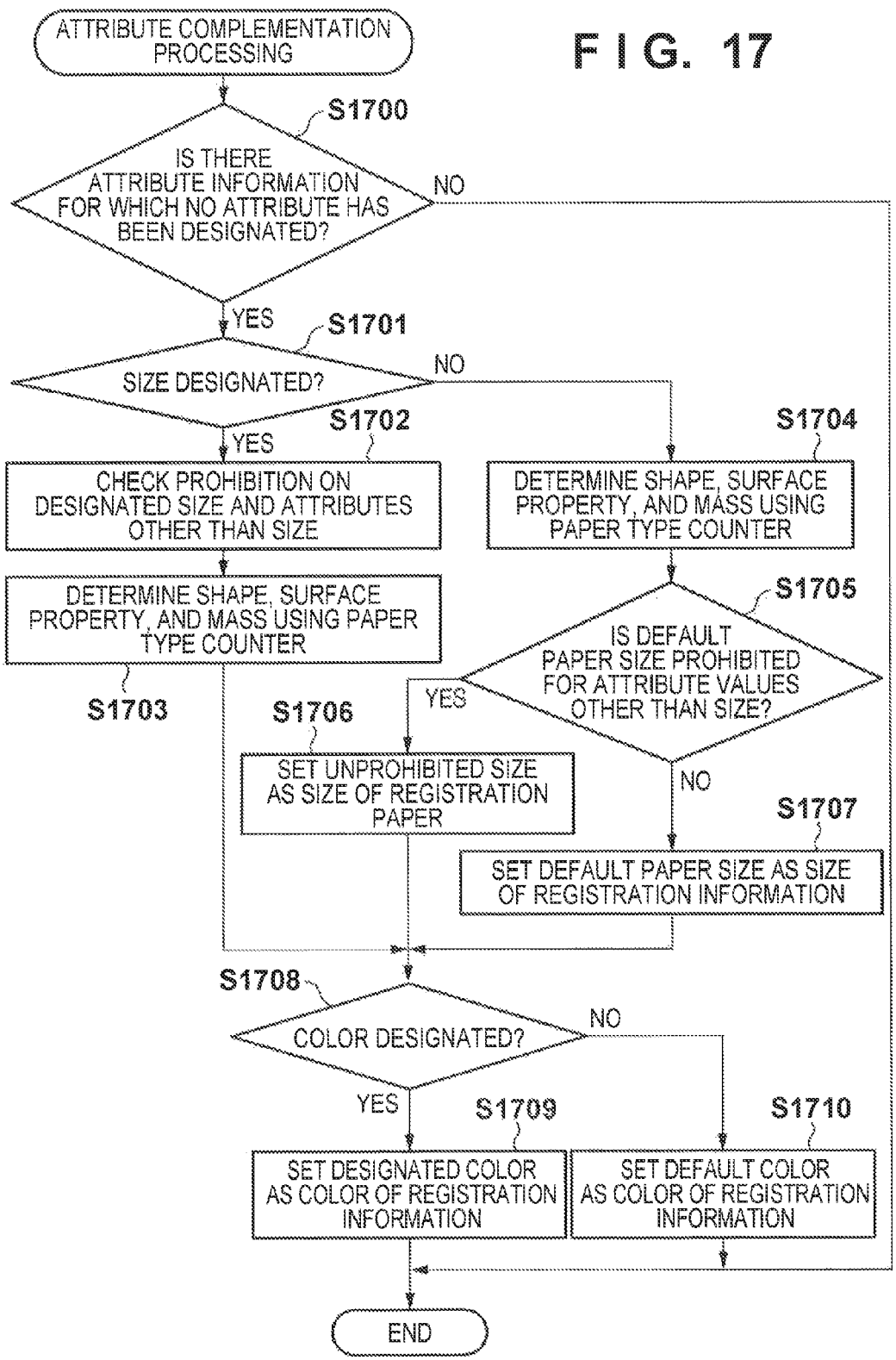
FIG. 17 is a flowchart showing an attribute complementation processing sequence by the image forming apparatus according to the embodiment.

The processing sequence of attribute complementation processing by the registration information creation unit 1503 will be explained with reference to FIG. 17. The following processing is implemented by reading out a control program stored in advance in the ROM 1512 or HDD 1514, and executing it by the CPU 1511. In step S1700, the registration information creation unit 1503 determines whether there is attribute information for which no attribute value has been designated. If the registration information creation unit 1503 determines that there is no undesignated attribute value, that is, all pieces of attribute information have been designated, attribute complementation processing ends.

If the registration information creation unit 1503 determines in step S1700 that there is attribute information for which no attribute value has been designated, the process advances to step S1701, and the registration information creation unit 1503 determines whether a size has been designated as attribute information. Since some combinations of the size and attribute values other than the size are prohibited, this determination is made not to create registration information of a prohibited combination. Assume that the prohibition means a state in which a combination of a predetermined size and attribute values other than the size is improper to execute printing.

If a size has been designated, the process advances to step S1702, and the registration information creation unit 1503 checks prohibition on the designated size and attribute values other than the size, and determines attribute values other than the size by using a paper type counter in step S1703 so as to avoid the prohibition. The process then advances to step S1708. FIG. 19 shows the paper type counter, and FIG. 20 shows a prohibited combination of the size and attribute values other than the size, details of which will be described later. When determining attribute values using the paper type counter, a combination which satisfies a combination of designated attribute values and exhibits a highest paper count is selected from combinations (hatched portions in FIG. 19) for which the number of sheets is counted. However, when a combination with the size is prohibited, it is excluded. For a combination for which the number of sheets is not counted, commonest values (in this example, the surface property is wood-free paper, the shape is normal, and the mass is 85 g/m$^2$) are set as attribute values.

If the registration information creation unit 1503 determines in step S1701 that no size has been designated, the process advances to step S1704, and the registration information creation unit 1503 determines attribute values other than the size first. Similar to step S1703, the attribute values are determined using the paper type counter, but the prohibition on size need not be taken into consideration. After determining attribute values other than the size, the process advances to step S1705, and the registration information creation unit 1503 determines whether a combination of the default paper size set in the device, the designated attribute value, and the attribute values determined in step S1704 is prohibited.

If the combination is prohibited, the process advances to step S1706, the registration information creation unit 1503 determines an unprohibited paper size as the size of registration information, and then the process advances to step S1708. As shown in FIG. 20, when the shape indicates the postcard and envelope, the postcard and envelope are determined as the size. For the remaining combinations, A4 is determined as the size. Note that the user can set and change the default size in the device via the interface. If the registration information creation unit 1503 determines in step S1705 that the combination is not prohibited, the process advances to step S1707, the registration information creation unit 1503 determines the default paper size as the size of registration information, and then the process advances to step S1708.

In step S1708, the registration information creation unit 1503 determines whether a color has been designated. If a color has been designated, the process advances to step S1709, the registration information creation unit 1503 determines the designated color as the color of registration information, and attribute complementation processing ends. If the registration information creation unit 1503 determines in step S1708 that no color has been designated, the process advances to step S1710, the registration information creation unit 1503 determines a default color (white in the embodiment) as the color of registration information, and attribute complementation processing ends. In this fashion, the attribute value is determined in order from attribute information having a high degree of influence on print settings, and the attribute value of attribute information such as color having a low degree of influence is determined last. In the embodiment, the attribute values are complemented based on the paper type counter and prohibited combination. Alternatively, all the attribute values may be complemented using default values without using these pieces of information.

<Paper Name Creation Processing>

Figure 18:
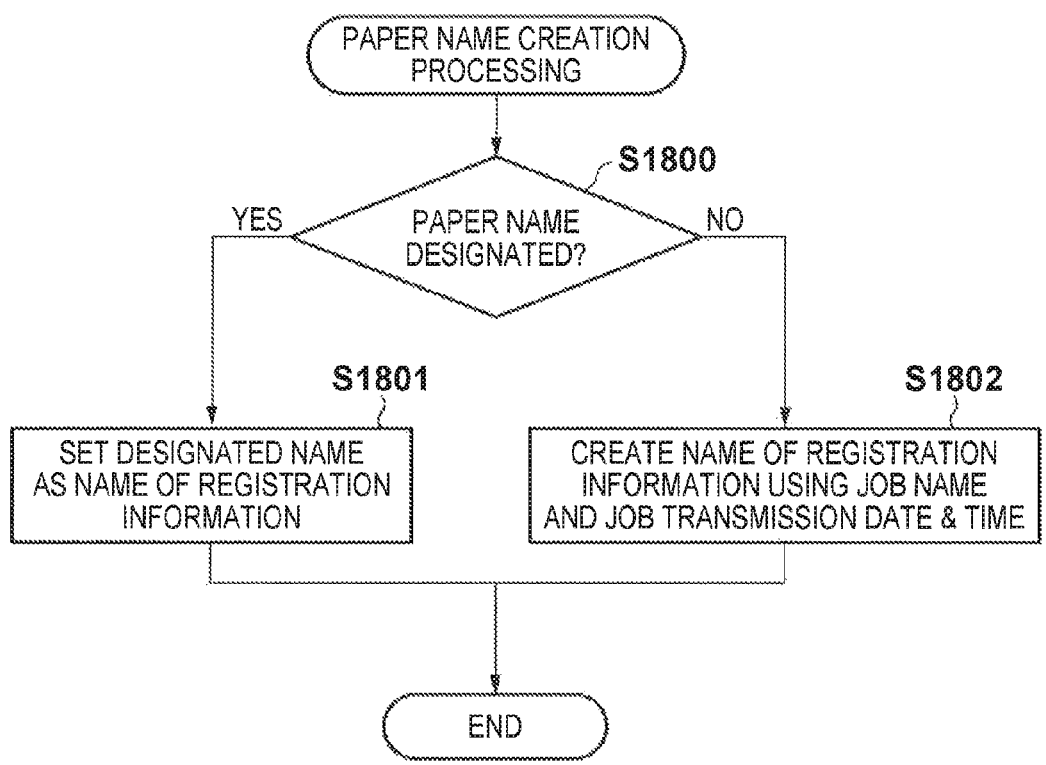
FIG. 18 is a flowchart showing a paper name creation processing sequence by the image forming apparatus according to the embodiment.

Paper name creation processing by the registration information creation unit 1503 will be explained with reference to FIG. 18. The following processing is implemented by reading out a control program stored in advance in the ROM 1512 or HDD 1514, and executing it by the CPU 1511. In step S1800, the registration information creation unit 1503 determines, based on the analysis result of a print job, whether a paper name has been designated. If the registration information creation unit 1503 determines in step S1800 that a paper name has been designated, the process advances to step S1801, and the registration information creation unit 1503 sets the designated name as the name of registration information.

If the registration information creation unit 1503 determines in step S1800 that no paper name has been designated, the process advances to step S1802, and the registration information creation unit 1503 creates a paper name by combining a job name and job transmission date & time. When no job name has been designated, the paper name may be created from only the transmission date & time. Note that the paper name creation method is not limited to this, and the name may be created by an arbitrary method in the embodiment as long as the name is different from the name of paper information held in the paper information accumulation unit 1507.

<Paper Type Counter>

The paper type counter will be explained with reference to FIG. 19. In this example, the number of print sheets is counted for each combination of attribute values regarding three types of attribute information, that is, a shape 1900, surface property 1901, and mass 1902. The number of types of attribute information to be counted may be larger, for example, may include the size. In FIG. 19, counting is performed for only combinations at hatched portions, but may be done for all combinations. Counting may be executed more finely or intensively. For example, the number of sheets in a hatched item 1903 is counted when the shape is punched paper, the surface property is wood-free paper, and the grammage is 80 to 105 g/m².

<Prohibition>

A prohibited combination of the size and attribute values other than the size will be described with reference to FIG. 20. In this example, combinations other than hatched combinations are prohibited. For example, a combination of shape: index paper, surface property: all, and size: A3 is prohibited. However, the present invention is not intended to be limited to these combinations, and a prohibited combination of attributes and a combination of these attribute values are not limited to this example. Note that the table information shown in FIG. 20 is stored in advance in the HDD 1514. The HDD 1514 corresponds to an example of the prohibition storage arrangement which stores the attribute value of another attribute information which cannot be set.

<Paper Information Registration Processing>

Figure 21:
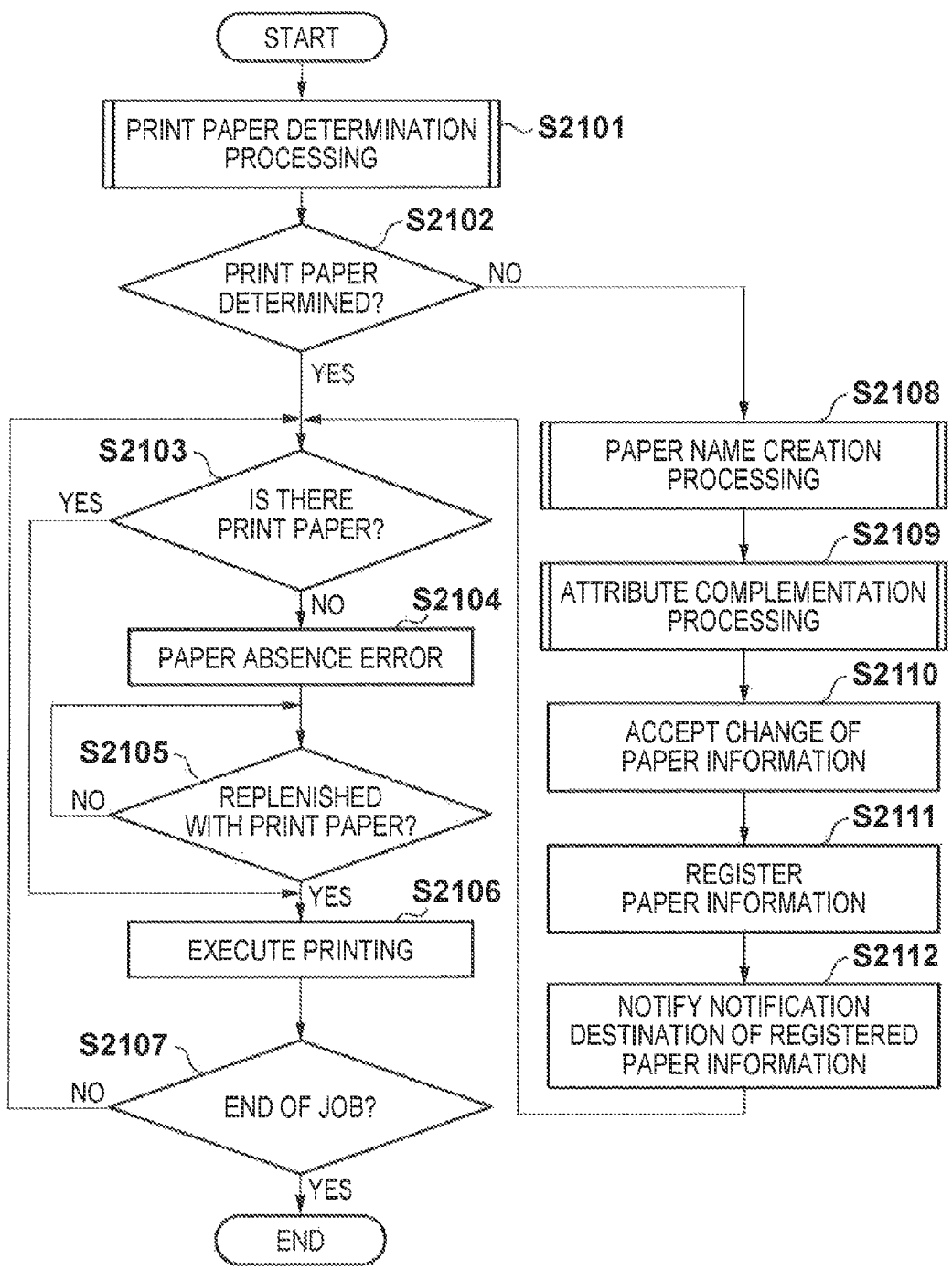
FIG. 21 is a flowchart showing a paper information registration processing sequence by the image forming apparatus according to the embodiment.

The processing sequence of paper information registration processing in the embodiment will be explained with reference to FIG. 21. The following processing is implemented by reading out a control program stored in advance in the ROM 1512 or HDD 1514, and executing it by the CPU 1511. Upon receiving a print job having paper information which designates paper for use in printing, the print job analysis unit 1500 analyzes the print job. In step S2101, the print paper control unit 1502 executes print paper determination processing based on the job analysis result, determining paper for use in printing. Note that print paper determination processing has been described with reference to FIG. 16, and a description thereof will not be repeated. In step S2102, the print paper control unit 1502 determines whether paper for use in printing has been determined as a result of print paper determination processing. If the print paper control unit 1502 determines in step S2102 that paper for use in printing has been determined, the process advances to step S2103; if NO, to step S2108.

In step S2103, the print paper control unit 1502 determines whether paper for use in printing has been set in the paper cassette. If the print paper control unit 1502 determines in step S2103 that paper for use in printing has been set in the paper cassette, the process advances to step S2106; if NO, to step S2104.

In step S2104, the print paper control unit 1502 displays a screen representing a paper absence error on the display unit of the operation unit 1519. In step S2105, the print paper control unit 1502 waits until the paper cassette is replenished with paper for use. After the paper cassette is replenished with paper for use, the print paper control unit 1502 continues the job, and the process advances to step S2106.

In step S2106, the printer 1520 prints based on the received print job. In step S2107, the print control unit 1501 determines whether the job has ended. If the print control unit 1501 determines in step S2107 that the job has ended, the process ends; if NO, returns to step S1503.

Step S2108 will be explained. In step S2108, the registration information creation unit 1503 executes paper name creation processing. Note that paper name creation processing has been described with reference to FIG. 18, and a description thereof will not be repeated. In step S2109, the registration information creation unit 1503 executes attribute complementation processing, and complements the attribute value of undesignated attribute information to create registration information. Note that attribute complementation processing has been described with reference to FIG. 17, and a description thereof will not be repeated. Paper indicated by the paper information determined by paper name creation processing and attribute complementation processing serves as paper for use in printing.

Figure 22:
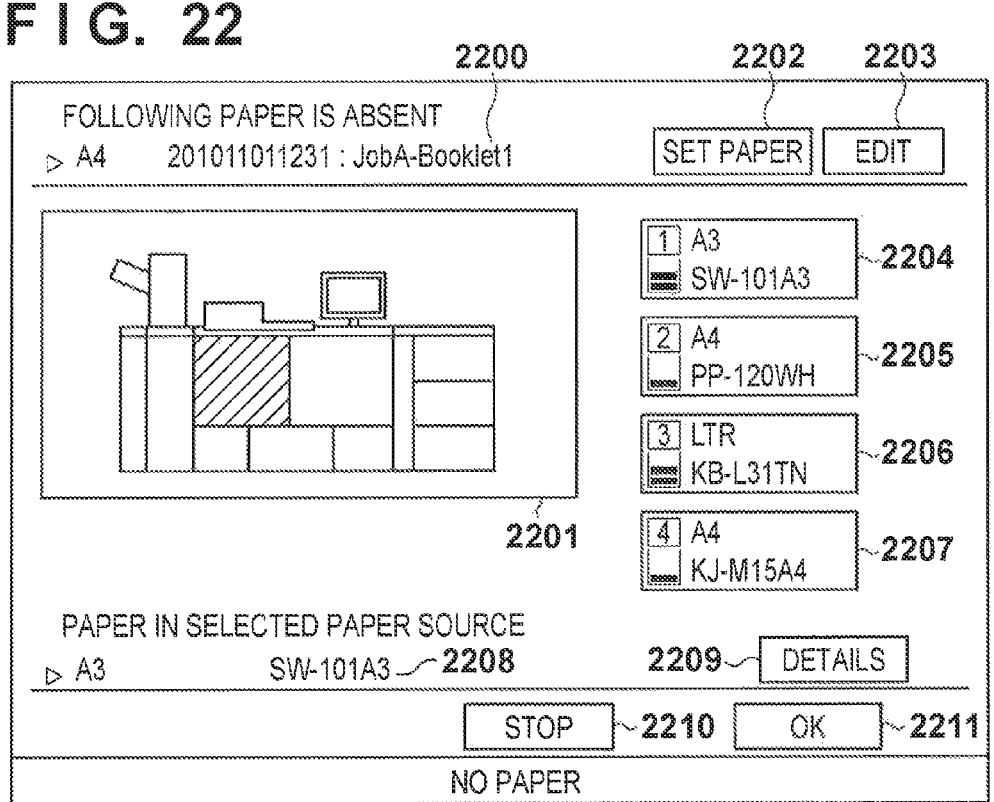
FIG. 22 is a view exemplifying a screen displayed on the operation unit of the image forming apparatus according to the embodiment.

In step S2110, the display unit of the operation unit 1519 displays a screen for registering, in the paper information accumulation unit 1507, the paper information determined by paper name creation processing and attribute complementation processing. FIG. 22 exemplifies the screen displayed at this time. The screen in FIG. 22 also represents a paper absence error because paper for use in printing has not been set yet in the paper source of the image forming apparatus 1402 in step S2110. According to the embodiment, attribute information of paper information to be registered can be changed in accordance with a user instruction via the interface until the paper information is registered. When the attribute information is changed, paper information representing paper for use in printing and paper information to be registered comply with those after the change.

In step S2111, the print paper control unit 1502 registers, in the paper information accumulation unit 1507, paper information determined by paper name creation processing and attribute complementation processing, or paper information changed by the user. In step S2112, the interface unit 1505 transmits the registered paper information to the PC (information processing apparatus) 1400. The transmission destination may be the PC 1400-1 which has transmitted the job. When the job designates a transmission destination, the registered paper information may be transmitted to the designated PC 1400-n. The transmission method is, for example, JMF (Job Messaging Format). The use of JMF allows registering exactly the same paper information in an arbitrary JMF-compatible image forming apparatus 1402-n from the terminal at the transmission destination. Note that the registered paper information may be directly transmitted to an arbitrary image forming apparatus 1402-n without the mediacy of the PC 1400.

<Examples of Screens>

Examples of screens displayed on the display unit of the operation unit 1519 of the image forming apparatus in the embodiment will be described. First, a UI screen displayed in step S2110 will be explained with reference to FIG. 22. At this stage, no paper information has been registered. A display area 2200 displays a paper name as paper information to be registered. A display area 2201 displays a paper cassette arrangement, and a currently selected paper cassette is highlighted. A button 2202 is used when paper information to be registered is set for a paper cassette. When the operator presses this button, the screen shifts to a screen in FIG. 23 (to be described later).

A button 2203 is used to change attribute information of paper information to be registered. When the operator presses this button, the screen shifts to a screen in FIG. 24 (to be described later). Each of display areas 2204 to 2207 displays paper information currently set for a paper cassette. A display area 2208 displays paper information set for a currently selected paper cassette (tray 1 in FIG. 24). By pressing a button 2209, detailed information of paper information in the display area 2208 can be displayed. A button 2210 is pressed to stop a print job. When the print job stops, paper information displayed in the display area 2200 is not registered. A button 2211 is used to close the screen in FIG. 22. Even if the operator presses this button, the paper absence state is not canceled, and the print job is suspended. A display area 2212 displays the current device state.

Figure 23:
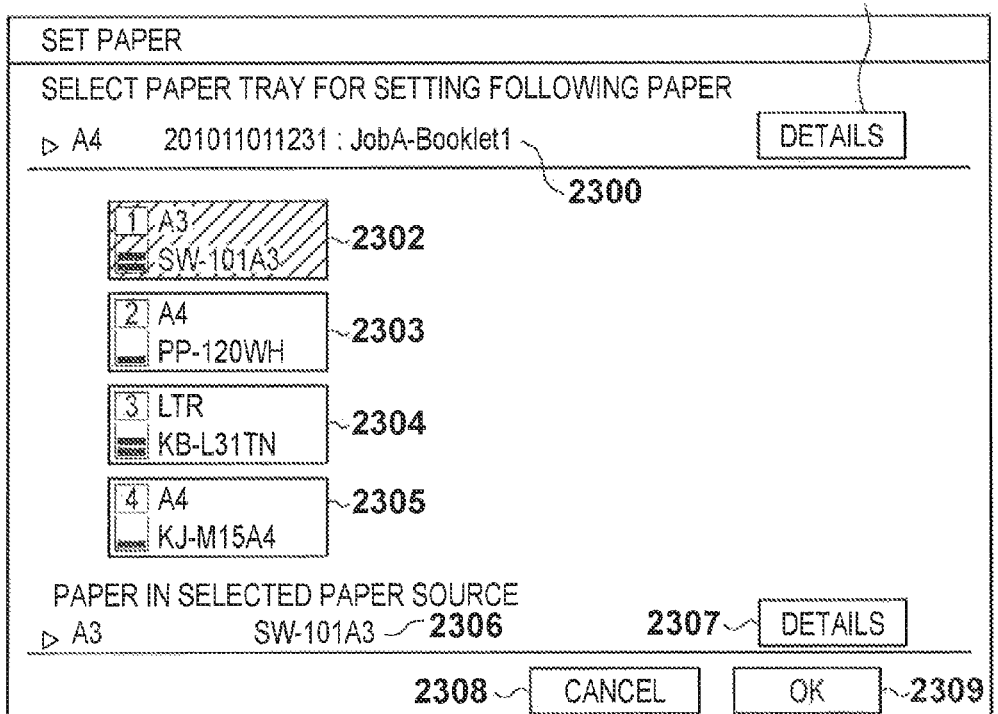
FIG. 23 is a view exemplifying a screen displayed on the operation unit of the image forming apparatus according to the embodiment.

FIG. 23 shows a screen to which the screen in FIG. 22 shifts in response to pressing of the button 2202. FIG. 23 exemplifies a screen for setting paper information to be registered for a paper cassette. A display area 2300 displays paper information to be set. By pressing a button 2301, the operator can see more detailed information. Buttons 2302 to 2305 are used to select a paper cassette to be set. In FIG. 23, paper cassette 1 (button 2302) is selected. A display area 2306 displays paper information currently set for the selected paper source. By pressing a button 2307, the operator can see more detailed information. By pressing a button 2308, the operator can stop setting of paper information. By pressing this button, the screen shifts to one in FIG. 22. By pressing a button 2309, paper information displayed in the display area 2300 is set for the selected paper cassette. If paper indicated by the paper information set for the selected paper cassette is set, the paper absence state is canceled.

FIG. 24 shows a screen to which the screen in FIG. 22 shifts in response to pressing of the button 2203. FIG. 24 exemplifies a paper information edit screen. Display areas 2400 to 2405 display the attribute values of pieces of attribute information. The operator presses a corresponding edit button out of buttons 2406 to 2411 to shift to an edit screen, and can change each of the attribute values. For example, FIG. 25 shows a screen when the operator presses the button 2410 to shift to a screen for changing the surface property. After the end of the change, the operator presses a button 2412 to close the paper edit screen and shift to the screen in FIG. 22. The operator can open this screen again from the screen in FIG. 22 to edit paper information. Paper information can also be edited even after registration.

FIG. 25 shows a screen to which the screen in FIG. 24 shifts in response to pressing of the button 2410. FIG. 25 exemplifies a screen for editing the surface property as an example of paper information editing. The operator selects the attribute value of a surface property to be changed from buttons 2500 to 2506. In FIG. 25, recycled paper is selected. A button 2507 is pressed to stop change of the attribute value. When the operator presses the button 2507, the value is not changed to a selected attribute value. A button 2508 is used to change the attribute value. When the operator presses the button 2508, the value is changed to a selected attribute value.

FIG. 26 exemplifies a registered paper information list screen. A display area 2600 displays paper information so that the operator can grasp that the paper information has been registered by paper information registration processing shown in FIG. 21. Similarly, a display area 2601 displays paper information in a different form so that the operator can grasp that the paper information has been edited after registration. Each of display areas 2602 to 2607 displays registered paper information. When the operator selects paper information and presses a button 2608, he can edit the selected paper information. For example, by pressing the button 2608, the screen shifts to one in FIG. 24 and after editing, returns to the screen in FIG. 26. In FIG. 26, the top paper information is selected. By pressing a button 2609, the screen is closed.

<Transmission of Registration Information>

An example of transmitting registered paper information to the information processing apparatus (PC) 1400 will be explained with reference to FIG. 27. An information processing apparatus 2700 corresponds to the PC 1400-1, and is an information processing apparatus which has transmitted a print job. An image forming apparatus 2701 is a job transmission destination, and is an image forming apparatus which has registered paper information. Image forming apparatuses 2702 to 2704 are other image forming apparatuses connected on a network, and serve as targets in which exactly the same paper information as that registered in the image forming apparatus 2701 is to be registered.

Processes 2705 and 2706 are processes from input of a print job up to registration of paper information, and correspond to processes in steps S2101 and S2102, and S2107 to S2111. A process 2707 is a process of transmitting a job having registered paper information to the PC 2700. The process 2707 corresponds to step S2112. In FIG. 27, the transmission destination is the PC 2700 which has transmitted a job. However, the transmission destination is not limited to this, and suffices to be a network-connected information processing apparatus. A process 2708 is a process of registering paper information in the remaining image forming apparatuses 2702 to 2704 based on the information transmitted by the process 2707. By setting the same paper information, the paper information can be synchronized between a plurality of image forming apparatuses. When new paper is registered in one image forming apparatus among a plurality of image forming apparatuses connected to the printing system, the registration information is transmitted to and registered in the remaining image forming apparatuses. This can omit the labor of the user in each image forming apparatus.

As described above, according to the second embodiment, when paper information designates paper for use in printing and has not been registered in the image forming apparatus 1402, the paper information can be automatically registered in the image forming apparatus 1402, reducing the labor of setting the paper information by the user.

When undesignated attribute information exists in the paper information to be registered, the attribute information can be complemented and then registered in the image forming apparatus 1402, reducing the labor of setting the paper information by the user.

Further, when the paper information is registered in the image forming apparatus 1402, it can be registered even in other image forming apparatuses, reducing the labor of setting the paper information in other image forming apparatuses by the user.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus which performs a printing process based on a print job, the image forming apparatus comprising:
   a storing unit configured to store paper information including a paper attribute;
   a receiving unit configured to receive a print job which specifies a paper attribute for specifying paper used in the printing process;

a determining unit configured to determine whether the storing unit stores the paper information including the paper attribute specified by the print job received by the receiving unit;

a generating unit configured to, in a case where the determining unit determines that the storing unit does not store the paper information including the paper attribute specified by the print job received by the receiving unit, generate new paper information by using the paper attribute specified by the print job; and a registration unit configured to register in the storing unit the new paper information generated by the generating unit.

2. The image forming apparatus according to claim 1, wherein, in a case where there exists, in a plurality of paper attributes included in the paper information stored in the storing unit, a paper attribute which is not specified by the print job received by the receiving unit, the generating unit generates the new paper information by performing a complementary process using the paper attribute which is not specified by the print job received by the receiving unit.

3. The image forming apparatus according to claim 1, further comprising a transmitting unit configured to transmit to an external apparatus the new paper information generated by the generating unit.

4. The image forming apparatus according to claim 1, wherein the generating unit further generates a name of the new paper information.

5. The image forming apparatus according to claim 4, wherein the generating unit generates the name of the new paper information by using date information.

6. The image forming apparatus according to claim 1, further comprising an editing unit configured to edit a paper attribute included in the new paper information according to a user instruction.

7. The image forming apparatus according to claim 6, further comprising a displaying unit configured to display a screen for allowing a user to edit the paper attribute included in the new paper information generated by the generating unit, wherein the editing unit edits the paper attribute included in the new paper information according to the user instruction accepted via the screen displayed by the displaying unit.

8. The image forming apparatus according to claim 1, wherein the storing unit stores a plurality of pieces of paper information.

9. A method for performing a printing process based on a print job, the method comprising:

storing paper information including a paper attribute;

receiving a print job which specifies a paper attribute for specifying paper used in the printing process;

determining whether the paper information including the paper attribute specified by the received print job is stored;

generating, in a case where it is determined that the paper information including the paper attribute specified by the received print job is not stored, new paper information by using the paper attribute specified by the print job; and registering the new paper information.

10. A non-transitory computer-readable storage medium storing a program for causing a computer to execute a method for performing a printing process based on a print job, the method comprising:

storing paper information including a paper attribute;

receiving a print job which specifies a paper attribute for specifying paper used in the printing process;

determining whether the paper information including the paper attribute specified by the received print job is stored;

generating, in a case where it is determined that the paper information including the paper attribute specified by the received print job is not stored, new paper information by using the paper attribute specified by the print job; and registering the new paper information.

* * * * *